US008995344B2

(12) United States Patent
Bertagna et al.

(10) Patent No.: US 8,995,344 B2
(45) Date of Patent: Mar. 31, 2015

(54) ASSIST ENGINE FOR TRANSMIT AND RECEIVE FUNCTIONS IN A MODULAR WIRELESS NETWORK ACCESS DEVICE

(71) Applicants: Drew Bertagna, Thousand Oaks, CA (US); David Rosen, Woodland Hills, CA (US)

(72) Inventors: Drew Bertagna, Thousand Oaks, CA (US); David Rosen, Woodland Hills, CA (US)

(73) Assignee: Xirrus, Inc., Thousand Oaks, CA (US)

( * ) Notice: Subject to any disclaimer, the term of this patent is extended or adjusted under 35 U.S.C. 154(b) by 284 days.

(21) Appl. No.: 13/647,054

(22) Filed: Oct. 8, 2012

(65) Prior Publication Data

US 2013/0089031 A1 Apr. 11, 2013

Related U.S. Application Data

(60) Provisional application No. 61/544,942, filed on Oct. 7, 2011.

(51) Int. Cl.
*H04W 88/08* (2009.01)
*H01Q 3/24* (2006.01)

(52) U.S. Cl.
CPC .............. *H04W 88/08* (2013.01); *H01Q 3/242* (2013.01)
USPC .......................................... 370/328; 370/338

(58) Field of Classification Search
CPC ..... H04W 88/08; H04W 88/12; H04W 92/10; H04W 92/22; H01Q 3/242
USPC ......... 370/310, 328, 338, 351, 389, 412, 419, 370/420, 422, 425, 428; 455/403, 422.1, 455/39, 500, 507
See application file for complete search history.

(56) References Cited

U.S. PATENT DOCUMENTS

2010/0128682 A1* 5/2010 Karaoguz et al. ............. 370/329
2014/0198631 A1* 7/2014 Cavanna et al. .............. 370/218

* cited by examiner

*Primary Examiner* — Obaidul Huq
(74) *Attorney, Agent, or Firm* — Francisco A. Rubio-Campos; Apogee Law Group P.C.

(57) ABSTRACT

A wireless network access device comprising a radio interface with a serial communication line, a switch, and M serial connections to M connectors for connecting up to M corresponding detachable radio modules. The radio interface forms up to M individually addressable radio communications paths. Each radio module includes a radio configured to communicate with client devices in a coverage area and a radio processor configured to manage at least one radio receiving buffer. The radio receiving buffers store receiver buffer identifiers to corresponding received data space. A processor manages communication between the client devices that communicate with the radio modules and a data network via the radio interface and a network interface when N≤M radio modules are connected to the radio interface. An assist engine is connected in the serial connection between the processor and the switch to manage allocation of receive buffer identifiers to the radio modules.

18 Claims, 13 Drawing Sheets

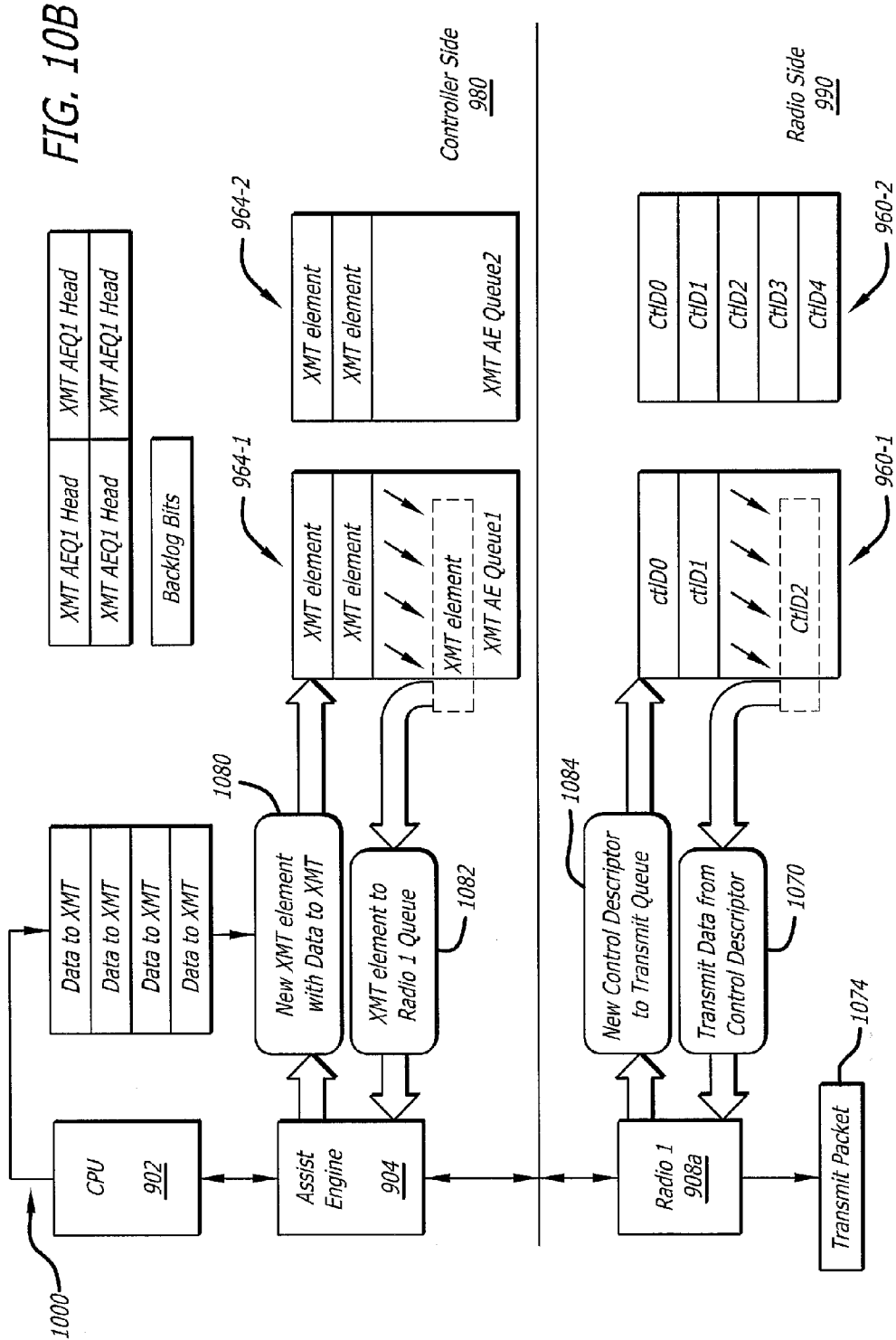

ASSIST ENGINE FOR TRANSMIT AND RECEIVE FUNCTIONS IN A MODULAR WIRELESS NETWORK ACCESS DEVICE

REFERENCE TO RELATED APPLICATIONS

This application claims priority of U.S. Provisional Application Ser. No. 61/544,942, titled "Modular Wireless Network Array Having Transmit/Receive Assist Functions," filed on Oct. 7, 2011, which is incorporated by reference herein in its entirety.

Reference is made to U.S. Provisional Application Ser. No. 61/521,218, titled "Modular Wireless Network Array," filed on Aug. 9, 2011, the contents of which are incorporated by reference herein.

Reference is made to U.S. patent application Ser. No. 13/566,711, titled "Modular Wireless Network Access Device," filed on Aug. 3, 2012, which is incorporated by reference herein in its entirety.

BACKGROUND OF THE INVENTION

1. Field of the Invention

This invention relates generally to systems and methods for providing wireless networking resources and more particularly to, modular wireless networking that include radio packet transmission and reception performance enhancement.

2. Related Art

The use of wireless communication devices for data networking is growing at a rapid pace. Data networks that use "WiFi" ("Wireless Fidelity"), also known as "Wi-Fi," are relatively easy to install, convenient to use, and supported by the IEEE 802.11 standard. WiFi data networks also provide performance that makes WiFi a suitable alternative to a wired data network for many business and home users. Wireless communications for data networks also include using the cellular telephone and mobile communications infrastructure. The use of Bluetooth® and other standards implementing a wide variety of wireless technologies is also growing.

In WiFi networks, wireless access points provide users having wireless (or "client") devices in proximity to the access point with access to data networks. The wireless access points include a radio that operates according to different aspects of the IEEE 802.11 specification. Generally, radios in the access points communicate with client devices by utilizing omnidirectional antennas that allow the radios to communicate with client devices in any direction. The access points are then connected (by hardwired connections) to a data network system, which completes the access of the client device to the data network.

WiFi access points typically include a single omnidirectional radio that communicates with the clients in proximity to the access point. Recently, WiFi systems have incorporated multiple radios with an integrated controller connected to a LAN, or other data network infrastructure. Examples of such multiple radio WiFi systems are disclosed in:

- U.S. patent application Ser. No. 11/816,003, filed on Aug. 10, 2007, titled "Wireless LAN Array," and incorporated herein by reference in its entirety;
- U.S. patent application Ser. No. 11/816,060, filed on Aug. 10, 2007, titled "Assembly and Mounting for Multi-Sector Access Point Array," and incorporated herein by reference in its entirety;
- U.S. patent application Ser. No. 11/816,061, filed on Aug. 10, 2007, titled "Media Access Controller for Use in a Multi-Sector Access Point Array," and incorporated herein by reference in its entirety;
- U.S. patent application Ser. No. 11/816,064, filed on Apr. 3, 2008, titled "Antenna Architecture of a Wireless LAN Array," and incorporated herein by reference in its entirety;
- U.S. patent application Ser. No. 11/816,065, filed on Aug. 10, 2007, titled "System for Allocating Channels in a Multi-Radio Wireless LAN Array," and incorporated herein by reference in its entirety.

WiFi access points that employ multiple radios use radios specifically configured for operation in the specific WiFi access point implementation. The multiple radios are also provided as multiple radio chains in a single structure, or in multiple modules in which single radios do not operate or may not be removed or added independently of each other. As such, the access points lack the flexibility to use independently configured radios, or technologies.

There is a need for wireless networking solutions that allow control over radios that operate independently without any functional or physical dependency on other radios, interchangeably to allow radios to be replaced with other radios in an implementation, and differently using different standards or variations of standards or technologies.

SUMMARY

A wireless network access device comprising a radio interface with a serial communication line, a switch, and M serial connections to M connectors for connecting up to M corresponding detachable radio modules. The radio interface forms up to M individually addressable radio communications paths. Each radio module includes a radio configured to communicate with client devices in a coverage area and a radio processor configured to manage at least one radio receiving buffer. The radio receiving buffers store receiver buffer identifiers to corresponding received data space. A processor manages communication between the client devices that communicate with the radio modules and a data network via the radio interface and a network interface when N≤M radio modules are connected to the radio interface. An assist engine is connected in the serial connection between the processor and the switch to manage allocation of receive buffer identifiers to the radio modules.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

FIG. 10B is a schematic diagram illustrating operation of an example method for assisting transmission of data from a radio in the system shown in FIG. 10A.

DETAILED DESCRIPTION

Figure 1:
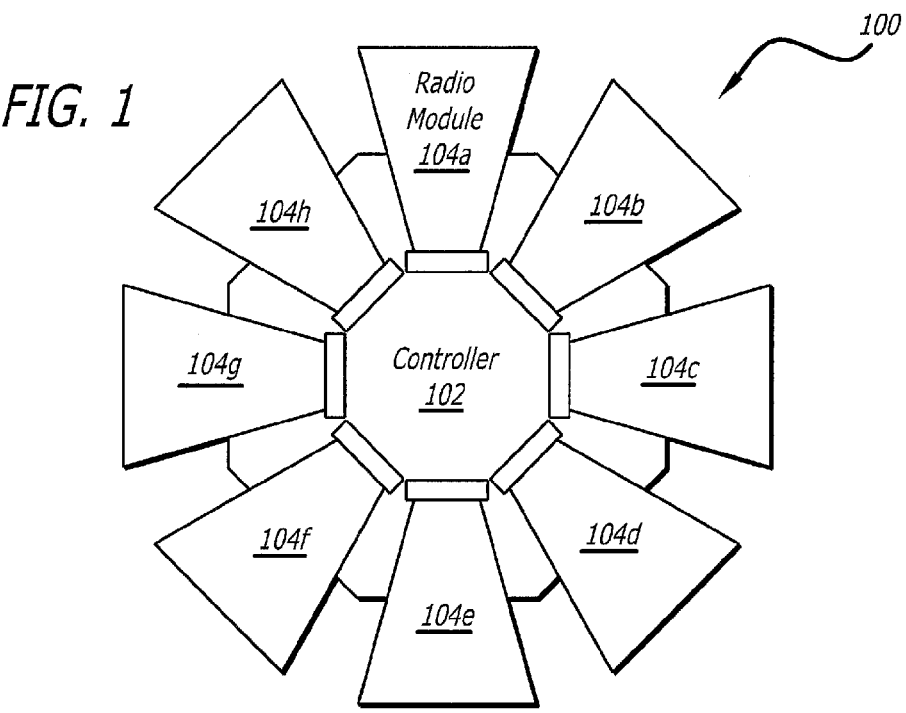
FIG. 1 is an overhead schematic view of an example of a wireless network array.

In the following description of example embodiments, reference is made to the accompanying drawings that form a part of the description, and which show, by way of illustration, specific example embodiments in which the invention may be practiced. Other embodiments may be utilized and structural changes may be made without departing from the scope of the invention.

I. Overview

Examples of modular wireless network platforms are described below as wireless network arrays that may be implemented in a circular housing having a plurality of radial sectors and a plurality of antennas arranged to provide coverage in the radial sectors. One or more of the plurality of antennas may be arranged within individual radial sectors of the plurality of radial sectors.

The radial sectors may be configured to define radiation patterns, or coverage patterns, that cover airspace in targeted sections, or sectors. The coverage patterns may be configured in a manner that, when combined, a continuous coverage is provided for a client device that is in communication with the wireless network array. The radiation patterns may overlap to ease management of a plurality of client devices by allowing adjacent sectors to assist each other. For example, adjacent sectors may assist each other in managing the number of client devices served with the highest throughput as controlled by an array controller. The arrangement of antennas in radial sectors provides increased directional transmission and reception gain that allow the wireless network array and its respective client devices to communicate at greater distances than standard omnidirectional antenna systems, thus producing an extended coverage area when compared to an omnidirectional antenna system.

The antennas used in the radial sectors may include any suitable number and type of antenna in each sector. Examples of antenna arrays that may be used are described in:

PCT Patent Application No. PCT/US2006/008747, filed on Jun. 9, 2006, titled "WIRELESS LAN ANTENNA ARRAY," and incorporated herein by reference in its entirety, U.S. patent application Ser. No. 12/269,567 filed on Nov. 12, 2008, titled "MIMO Antenna System," and incorporated herein by reference in its entirety, U.S. patent application Ser. No. 12/987,040 ("'040") filed on Dec. 31, 2010, titled "MIMO Antenna System," and incorporated herein by reference in its entirety, and U.S. patent application Ser. No. 13/115,091("'091") filed on May 24, 2011, titled "MIMO Antenna System having Beamforming Networks," and incorporated herein by reference in its entirety.

For purposes of maintaining clarity in the description of the example wireless network arrays below, the antennas in the examples are described as employing multiple input, multiple output ("MIMO") schemes. It is to be understood by those of ordinary skill in the art that example implementations are not limited to the type of antennas described.

The examples of wireless network access devices described below include independently operating radio modules in each radial sector. The radio modules may provide a coverage pattern as described above, or each radio module may be configured to generate independent coverage patterns, which may include directional or omni-directional radiation patterns. The number of radio modules used in the wireless network access device may also be varied and various different radio module types may be combined to provide scalability of performance, cost, and diversity of functionality in any given implementation.

II. Modular Wireless Network Array

FIG. 1 is an overhead schematic view of an example of a wireless network access device 100 having a controller 102 and a plurality of radio modules 104a-104h. The example wireless network access device 100 in FIG. 1 includes eight radio modules 104a-104h. The controller 102 may be configured to operate with an optional number of radio modules 104 up to a maximum of 8 in FIG. 1. The controller 100 may be configured to operate in different modes involving a certain number of radio modules 104. For example, the controller 102 may be configured to operate in a 4-port, or an 8-port wireless network access device. The controller 102 may also simply adapt to the number of radio modules 104 connected to it. The controller 102 may be configured to ensure a 360° coverage pattern regardless of the number of radio modules 104, or to cover an area having a shape customized for a specific installation.

Figure 2:
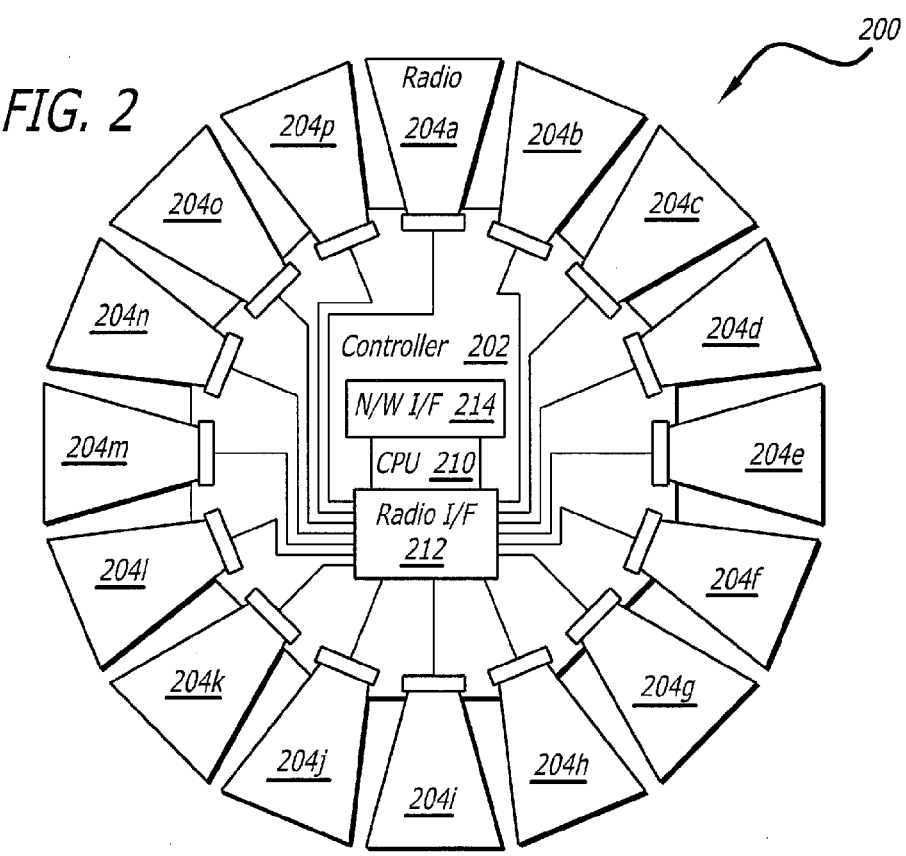
FIG. 2 is an overhead schematic view of another example of a wireless network array.

FIG. 2 is an overhead schematic view of an example of a wireless network access device 200 having a controller 202 and a plurality of radio modules 204a-204p. The wireless network access device 200 in FIG. 2 is similar to the wireless network access device 100 in FIG. 1 except that up to 16 radio modules 204a-204p may be connected to the controller 202 instead of the 8 in FIG. 1. The wireless network access device 200 in FIG. 2 also shows a block diagram of the controller 202 including a central processor 210, a radio interface 212, and a network interface 214. The central processor 210 provides the processing resources for the controller 202. The central processor 210 operates with the radio interface 212 to communicate with the radio modules 204a-p, and the network interface 214 to connect the wireless network access device 200 to wider data network resources.

The radio interface 212 is configured to connect the radio modules 204a-204p to data network resources as individual, independently operating radios configured to communicate with client devices in the radial sector in which the radios operate. Each radio module 204a-204p includes a single radio operating independently of the other radio modules 204a-204p. For example, one or more radio modules 204a-204p may be configured to operate as 3×3 802.11n radios, others may be configured to operate as 2×2 802.11n radios, others may have a single antenna chain, and others may be configured to communicate with cellular devices. One or more of the radio modules 204a-204p may also be configured to operate with an omnidirectional coverage pattern while one or more of the remaining radio modules 204a-204p may operate with a directional coverage pattern in the same installation. Each radio module 204a-204p includes an interface configured to operate with the radio interface 212 on the controller 202.

In one example implementation, the radio interface 212 operates using the standard PCI Express® ("PCIe®") peripheral interface. The radio interface 212 on the controller 202 communicates with each radio module 204a-204p connected to the controller 202 in accordance with the PCIe® standard. The radio interface 212 manages serial links to each radio module in accordance with the PCIe® standard. The PCIe® standard is not intended to be limiting. It is to be understood by those of ordinary skill in the art that any interface, whether standard or proprietary, may be used for communication to the radio modules 204a-204p.

The network interface 214 provides the radio modules 204a-204p with access to the data network resources allowing client devices in communication with the radio modules 204a-204p to communicate over data networks such as the Internet. Any suitable scheme may be used for the network interface 214, which may include hardware and software components that allow connectivity for a variety of radio types, including WiFi radios, cellular radios, and any other radio configured for operation in the wireless network access device 200 in FIG. 2.

The wireless network access devices 100, 200 shown in FIGS. 1 and 2 provide a modular and flexible platform for implementing wireless access. The wireless network access devices 100, 200 operate using controllers 102, 202 having a generalized interface to the radio modules 104 et seq, 204 et seq. The radio modules 104 et seq, 204 et seq implement the generalized interface regardless of the type of radio, or configuration or standard used for the radio. In addition, each radio module 104 et seq, 204 et seq conforms to the same size and shape. In an example implementation, radio modules 104 et seq, 204 et seq may be configured for operation on either the first wireless network access device 100 in FIG. 1, or in the second wireless array 200 in FIG. 2, where both wireless network access devices 100, 200 are made available. It is to be understood that the two wireless network access devices 100, 200 are described here as examples of configurations that may be used in terms of number of the radio modules as well as the shape selected to allow for modularity. Other examples may have more or fewer radio modules having a different shape.

III. Modular Wireless Network Platform Controller

Figure 3:
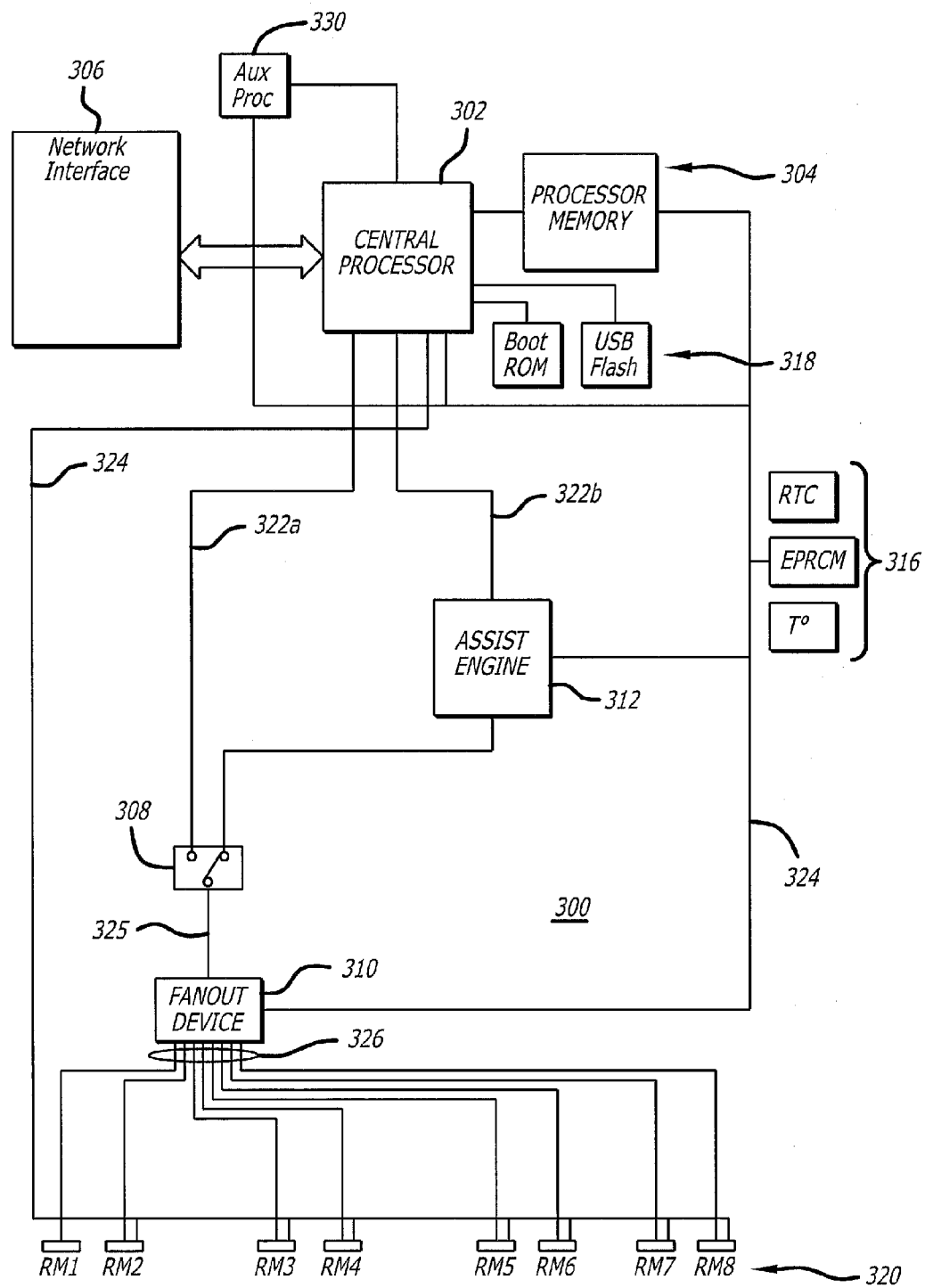
FIG. 3 is a schematic diagram of an example controller that may be used in the example wireless network array shown in FIG. 1.

FIG. 3 is a schematic diagram of an example controller 300 that may be used in the example wireless network access device 100 described above with reference to FIG. 1. The controller 300 in FIG. 3 includes a central processor 302, a processor memory 304, a network interface 306, a signal switch 308, a radio path fanout device 310, and an assist engine 312 for communication with up to eight radio modules 320. The controller 300 may be configured to provide a radio interface that includes a plurality of individually addressable point-to-point connections between the central processor 302 and each radio module. The point-to-point connections may be implemented as high-speed, serial connections at one, or a selectable one of several ports, on the central processor 302 over a first radio interface path from the port on the central processor 302 to the fanout device 310. The fanout device 310 may be controlled to select one of a plurality of radio paths connected from the fanout device 310 to a corresponding radio module 320 to complete the point-to-point connection between the central processor 302 and the corresponding radio module 320.

In an example implementation, the central processor 302 may include built-in interfaces and connections for any of the network interface 306 and the radio interface in accordance with selected standards. For example, the central processor 302 in the controller 300 in FIG. 3 may be an off-the-shelf processor having a standard Ethernet interface and a standard peripheral interface, such as for example a PCIe® interface. One example processor that may be used, without limitation, is a Cavium® Octeon® CN52xxx processor. In other example implementations, a more general purpose processor may be used, which may require adding components for implementing specific network and peripheral interface standards that may be desired. In the example shown in FIG. 3, the central processor 302 includes an Ethernet interface and a PCIe® interface accessible via connections directly on the processor device, or chip. Any suitable processor may be configured to operate as the central processor 302 in FIG. 3, and the radio interface may be implemented using a standard interface such as the PCIe® standard, or using a proprietary bus interface configured to operate as described herein.

The controller 300 includes other processor support components, such as for example, a non-volatile memory 318, including for example, a boot ROM and a USB FLASH drive interface. The controller 300 may include other support components 316, such as for example, a clock, EPROM, and a temperature sensor. An auxiliary processor 330 may also be included to offload housekeeping or administrative functions (such as watchdog) from the central processor 302. An integrated interface control bus 324 may also be included to allow the central processor 302 to address processing peripherals, such as the supporting processing components including the EPROM at 316, the auxiliary processor 330, and the assist engine 312 by software functions programmed to access the components. These support components, the integrated interface control bus and auxiliary processors are optional or basic computing equipment components that require no further discussion.

The central processor 302 in FIG. 3 includes two input/output (I/O) ports, or pins on the chip, for communicating over corresponding integrated and independent radio interface paths 322a, 322b to which the I/O ports connect. The control software operating under control of the central processor 302 may select one of the two radio interface paths 322a, 322b for communication with a selected one of up to eight radios 320. The control software may also control the signal switch 308 to enable the connection to the radio path fanout device 310. The fanout device 310 further controls the connection to the selected radio. Each of the radio interface paths 322a, 322b includes multiple lanes configured to perform full duplex transmit and receive functions. The multiple lanes provide increased bandwidth to each radio interface path 322a, 322b. In an example implementation in accordance with FIG. 3, each lane may have a bandwidth of up to 2 Gbps providing up to 4 Gbps for each radio interface path 322a, 322b. Each radio interface path 322a, 322b may be connected to one of the radios 320 to form a single link supported by the multiple lanes.

One of the two radio interface paths 322a, 322b may connect directly to the signal switch 308. The other radio interface path 322a, 322b may include an assist engine 312 operating in-line, or as a "look-aside" component for performing functions that assist the operation of the controller 300. These operations may provide boosts in performance, the ability to test performance, or other operation assisting functions. The signal switch 308 couples the selected radio interface path 322a, 322b to a single interface link 325 connected to the fanout device 310.

The radio path fanout device 310 connects the single two-lane interface link 325 to one of up to 8 single lane radio paths 326. The 8 single lane radio paths 326 extend to corresponding connectors on the controller 300 as illustrated in the controller 102 in FIG. 1. In an example implementation, each single lane radio path 326 may have a bandwidth of up to 2.0 Gbps if encoded (2.5 Gbps if un-encoded). The radio path fanout device 310 may be programmed and controlled, using for example, the integrated interface control bus 324, to tune the electrical qualities of each link for optimal performance. The selected single lane radio path 326 may then connect to the selected radio interface path 322a, 322b at the signal switch 308. The fanout device 310 controls the conversion from a single lane radio path 326 to a two-lane (transmit and receive) radio interface path 322a, 322b.

Figure 4:
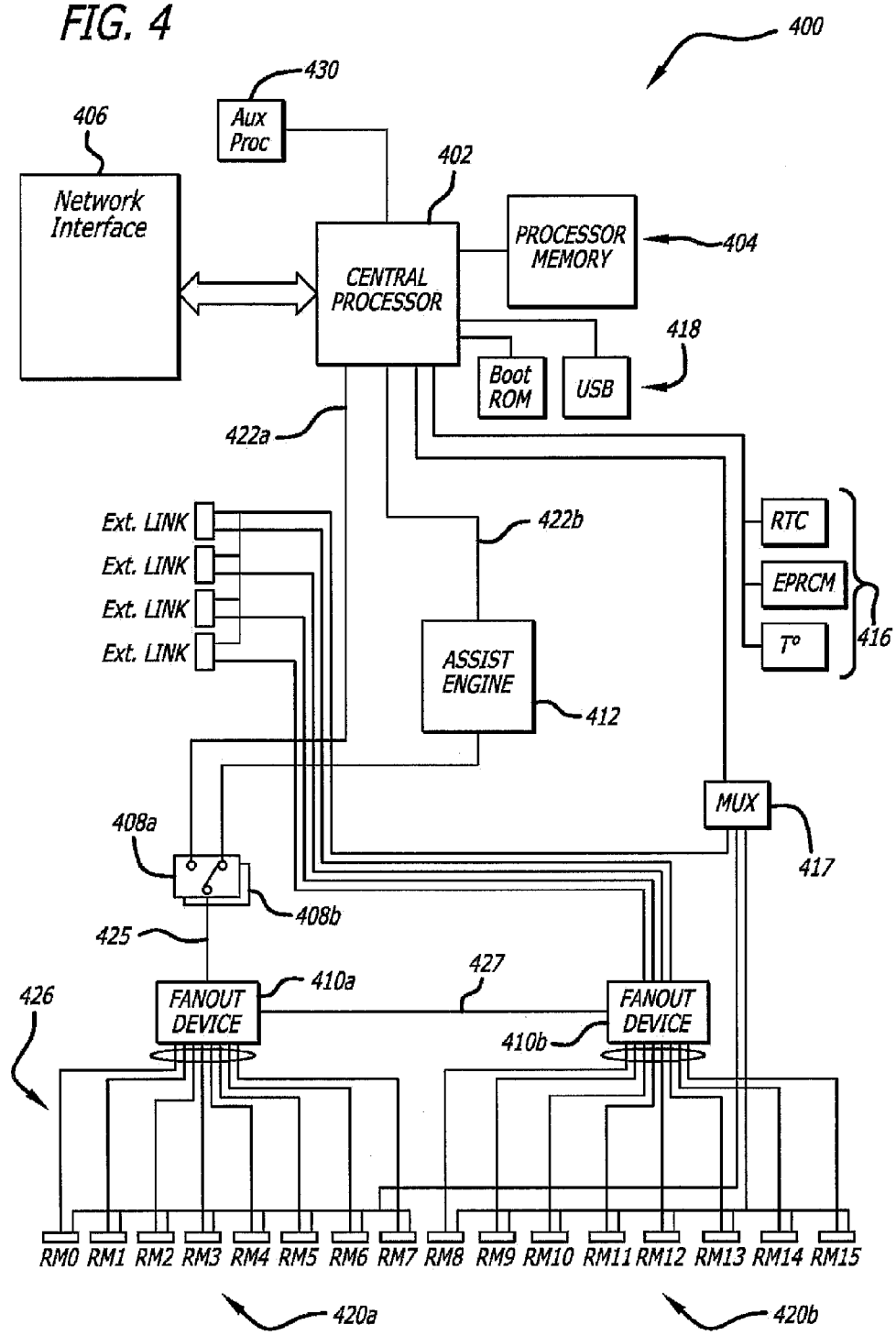
FIG. 4 is a schematic diagram of an example controller that may be used in the example wireless network array shown in FIG. 2.

FIG. 4 is a schematic diagram of an example controller 400 that may be used in the example wireless network access device 200 described above with reference to FIG. 2. The controller 400 in FIG. 4 includes a central processor 402, a processor memory 404, a network interface 406, a pair of signal switches 408a and 408b, a pair of radio path fanout devices 410a and 410b, and an assist engine 412 for communication with up to sixteen radio modules 420a,b. The controller 400 in FIG. 4 may include a radio interface configured similar to the radio interface described above with reference to FIG. 3. For example, the radio interface in the controller 400 may include multiple point-to-point serial connections between the central processor 402 and each radio module 420a and 420b. The central processor 402 may connect to the fanout device 410a, which connects to the radio modules 420a over individual radio paths.

In an example implementation, the central processor 402 may include built-in interfaces and connections for any of the network interface 406 and the radio interface in accordance with selected standards. For example, the central processor 402 in the controller 400 in FIG. 4 may be an off-the-shelf processor having a standard Ethernet interface and a standard peripheral interface, such as for example a PCIe® interface. One example processor that may be used, without limitation, is a Cavium® Octeon® CN63xxxx processor. In other example implementations, a more general purpose processor may be used, which may require adding components for implementing specific network and peripheral interface standards that may be desired. In the example shown in FIG. 4, the central processor 402 includes an Ethernet interface and a PCIe® interface accessible via connections directly on the processor device, or chip. Any suitable processor may be configured to operate as the central processor 402 in FIG. 4, and the radio interface may be implemented using a standard interface such as the PCIe® standard, or using a proprietary bus interface configured to operate as described herein.

The controller 400 may include other processor support components similar to the controller 300 in FIG. 3. The corresponding components are numbered, but no additional description is needed.

Similar to the central processor 302 in FIG. 3, the central processor 402 in FIG. 4 includes two input/output (I/O) ports, or pins on the chip, for communicating over corresponding integrated and independent radio interface paths 422a, 422b connected to the I/O ports. The control software operating under control of the central processor 402 may select one of the two radio interface paths 422a, 422b for communication with a selected one of up to sixteen radios 420. The control software may also control the signal switches 408a, 408b to enable the connection to the radio path fanout devices 410a, 410b. The fanout devices 410a, 410b further control the connection to the selected radio. Each of the radio interface paths 422a, 422b includes multiple lanes, each path operating as a full-duplex receive/transmit connection. Each radio interface path 422a, 422b configures the four lanes to provide a single link with a throughput equal to the sum of the four lanes. In an example implementation, each radio interface path 422a, 422b includes four lanes, where each lane may have a bandwidth of up to 2 Gbps (or 2.5 Gbps if unencrypted) providing up to 8 Gbps (or 10 Gbps if unencrypted) for each radio interface path 422a, 422b.

It is noted that the described examples of radio interface paths 322a, 322b (with reference to FIG. 3) and 422a, 422b (with reference to FIG. 4) conform to the PCI Express® interface standard. Other configurations according to other standards may be used as well. The radio interface paths may be parallel or serial buses, designed as proprietary interfaces or under another suitable standard.

One of the two radio interface paths 422a, 422b may connect directly to the signal switches 408a, 408b. Each switch 408a, 408b connects corresponding pairs of the multiple lanes that form the radio interface paths 422a, 422b. A single switch block that accommodates the four lanes may also be implemented. The other radio interface path 422a, 422b may include an assist engine 412 operating in-line, or as a "look-aside" component for performing functions that assist the operation of the controller 400. These operations may provide boosts in performance, the ability to test performance, or other operation assisting functions. The signal switches 408a, 408b couple the selected radio interface path 322a, 322b to a single four lane interface link 425 connected to the fanout device 310.

The radio path fanout devices 410a, 410b connects the single four-lane interface link 425 to one of up to 16 single lane radio paths 420a and 420b. Each radio path fanout device 410a, 410b connects to a corresponding group of 8 radio paths 420a, 420b. The 16 single lane radio paths 426 extend to corresponding connectors on the controller 400 as illustrated in the controller 202 in FIG. 2. In an example implementation, each single lane radio path 426 may have a bandwidth of up to 2.0 Gbps if encoded (2.5 Gbps if un-encoded). The radio path fanout devices 410 may be programmed and controlled, using for example, the integrated interface control bus 424 to tune the electrical qualities of each link for optimal performance. When more than eight radios are connected, the two radio path fanout devices 410a, 410b may cooperate via a fanout coupling 427 to select the correct radio. The radio path 426 may then connect to the selected radio interface path 422a, 422b at the signal switches 408a, 408b. The fanout devices 410a, 410b controls the conversion from a single lane radio path 426 to the multiple (4) lane radio interface paths 422a, 422b.

IV. Radio Modules

The wireless network access devices 100, 200 shown in FIGS. 1 and 2, respectively, are configured to operate using radio modules 104a-h and 204a-p in FIGS. 1 and 2 respectively, created from a single radio instance that includes an antenna design and a common physical shape. The shape enhances the operation of the antenna system by incorporating geometry that enhances the design of the antenna systems. The shape also allows the radio module 104 et seq, 204 et seq. to be used in a variety of products providing a platform on which to build various RF solutions. For example, a radio module may operate using a dual chain WiFi MIMO radio. Another radio module in the same implementation and connected to the same controller, may operate using a triple chain WiFi MIMO design; while still another radio module in the same implementation may operate using another dual chain WiFi that may have a different design, which may include a single in, single out design. By using one shape for the radio module, all three designs can be placed into a single system just by updating the system software.

The modularity provided by the radio module platform facilitates a system configuration and provides flexibility using easily interchangeable radio modules. This flexibility in the choice of radio technology may remain throughout the lifetime of the system and may even expand the flexibility available for enhancing system operation via field upgrades. Future radio modules may be designed using increasingly powerful chipsets that may be designed on to the radio module platform and inserted into the system as required.

The size and shape of the radio module also allow for the inclusion of the antennas directly onto the module. While different radio modules would most likely have different antennas (in terms of geometry, layout, and type of channel formed), space on the radio module allows them to be included directly on the module. In other example implementations, antennas could be off-board and adapted to connect using cable assemblies.

The electrical interface to the radio module from the controller (such as 102, 202 in FIGS. 1 and 2, respectively) may be proprietary or standard. An industry-standardized interface such as PCIe® may be selected on the basis of a simple connection already available on a host central processor card. The use of off the shelf chips, connectors, and software drivers may then be included to substantially lower the system cost.

In configuring a modular wireless network access device, radio modules may be adapted to:
1) Operate with an integrated wireless LAN AP/Controller with embedded, directionalized antenna systems that may be used in multiple product platforms.
2) Include multiple antenna systems suited for operation under platform specific requirements.
3) Mate electrically to the central processing unit through a PCI Express or other standardized interface protocols.
4) Mate mechanically to the central processing unit with a combination of a standardized connector and custom latching system.

Figure 5:
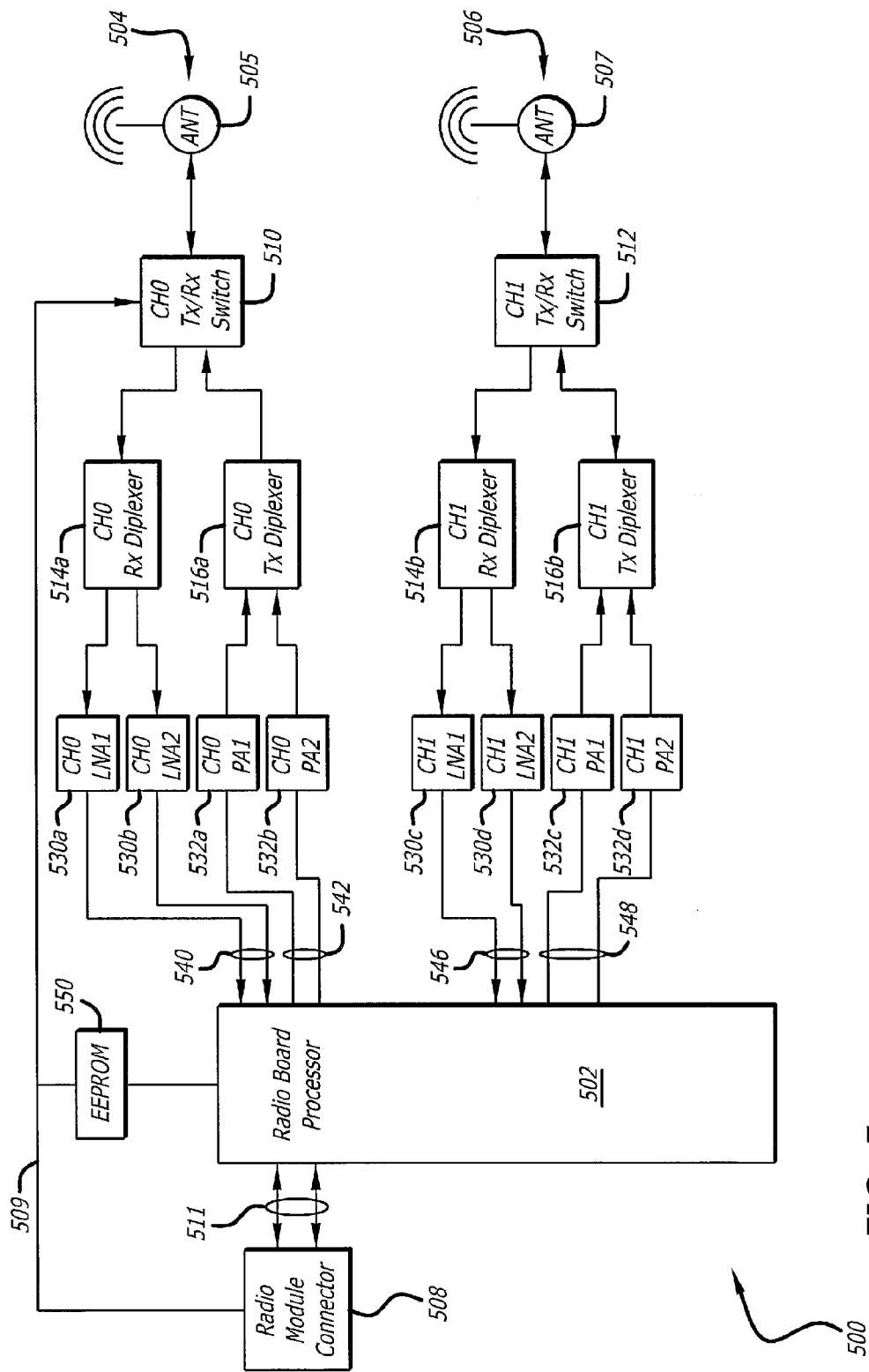
FIGS. 5 and 6 are schematic diagrams for examples of radios that may be implemented on a radio module shown in FIGS. 1 and 2.
Figure 6:
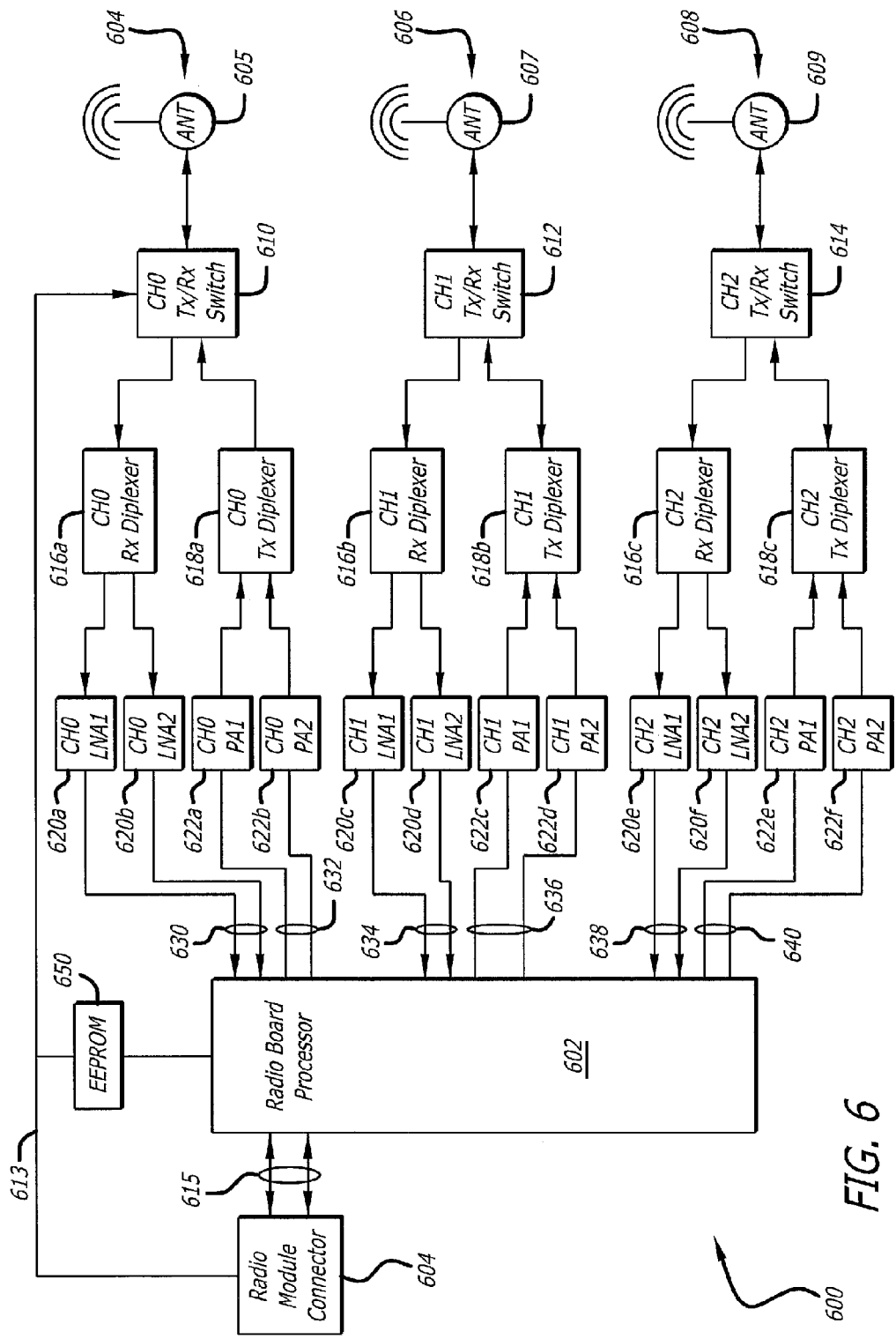

FIGS. 5 and 6 are schematic diagrams for examples of radios that may be implemented on a radio module shown in FIGS. 1 and 2. The radio 500 in FIG. 5 is a 2×2 MIMO radio and the radio 600 in FIG. 6 is a 3×3 MIMO radio. Other radios may also be used where implemented on boards that share the same size, outline, mechanical form, and electrical interface for operation with the controller 100, 200 (in FIG. 2). This allows multiple systems, with various performance characteristics, to be created from one central processor platform by combining different radio cards. Wireless characteristics that can be varied include MIMO configuration (number of transmit/receive chains), number of spatial streams (1, 2 or 3) and 802.11n features such as transmit beam forming or low density parity checking. Additionally, all radio boards may be made interoperable between a smaller 4/8-port platform (such as for example, the system in FIG. 1) and a larger 8/12/16 port platform (such as for example the system in FIG. 2).

FIG. 5 shows a 2×2 MIMO radio board 500 that uses a radio board processor 502 configured to perform digital media access control ("MAC") and baseband functions of the radio as well as the analog RF functions. In an example implementation, the radio board processor 502 may be based on an Atheros AR9392 chipset. The configuration in FIG. 5 shows a radio board 500 configured for 2×2 MIMO operation. The radio board 500 supports two spatial streams 504, 506 (also indicated as "Chain 0" and "Chain 1," respectively) and may sustain connection rates up to 300 Mbps in an application configured for operation according to the 802.11n specification.

The first spatial stream 504 and second spatial stream 506 include corresponding first and second antennas 505, 507. In an example implementation of the radio board 500, the first and second antennas 505, 507 may be configured to operate as described in the '040 and the '091 applications listed above. The first and second antennas 505, 507 each connect to tx/rx switches 510, 512, respectively in FIG. 5. The tx/rx switches 510, 512 may be controlled using a control connection to the radio board processor 502 to control whether the radio board is receiving or transmitting data wirelessly. The radio board 500 may be configured to implement advanced features of the 802.11n specification such as maximal ratio combining, beam forming and low density parity checking. The peripheral communication interface on the Atheros AR9392 is PCIe® so it plugs directly into a controller having a PCIe® interface, which may be one of the controllers 302, 402 described above with reference to both FIGS. 3 and 4.

Each tx/rx switch 510, 512 connects to diplexers that multiplex or demultiplex data over two lanes in each spatial stream 504, 506. In an example implementation, the diplexers switch the bandwidth of the radio operation between different radio bands. For example, the radio 500 in FIG. 5 may operate selectively in both the 2.4 Ghz and 5.0 Ghz unlicensed frequency bands. The diplexers enable the selection of the bands during radio operation. In the radio 500 in FIG. 5, the first tx/rx switch 510 connects to a chain 0 receiver diplexer 514a for receiving data, and a chain 0 transmitter diplexer 516a. The chain 0 receiver diplexer 514a receives data from the first antenna 505 via the tx/rx switch 510 (when triggered to receive data). The chain 0 receiver diplexer 514a de-multiplexes the data received from the first antenna 505 for output along parallel paths, each path having a first and second chain 0 low noise amplifier 530a, 530b. The first and second chain 0 low noise amplifiers 530a, 530b output received signals along respective chain 0 receiving lanes 540 to the radio board processor 502. The chain 0 receiving lanes 540 communicate analog RF signals that are processed by the radio board processor 502 consistent with the specifications under which the signal was communicated.

The chain 0 transmitter diplexer 516a multiplexes the data received from parallel transmitting paths at outputs of a first and second chain 0 power amplifier 532a, 532b and outputs the multiplexed signal to the first transmit/receive ("tx/rx") switch 510 for transmitting data wireless via the antenna 505 when switched to transmit. The first and second chain 0 power amplifiers 532a, 532b receive analog RF signals configured by the radio board processor 502 for wireless transmission pursuant to a selected specification understood by a client device to which the RF signals are directed. The analog RF signals are output by the radio board processor 502 on a pair of chain 0 transmitting lanes 542 connected to the first and second chain 0 power amplifiers 532a, 532b.

With respect to the second chain, chain 1, the second tx/rx switch 512 connects to a chain 1 receiver diplexer 514b for receiving data from the antenna 507, and a chain 1 transmitter diplexer 516b for transmitting data. The chain 1 receive diplexer 514b receives data from the second antenna 507 via the tx/rx switch 512 (when triggered to receive data). The chain 1 diplexer 514b demultiplexes the data received from the second antenna 507 for output along parallel paths having a first and second chain 1 low noise amplifier 530*c*, 530*d*. The first and second chain 1 low noise amplifiers 530*c*, 530*d* output received signals along respective chain 1 receiving lanes 546 to the radio board processor 502. The chain 1 receiving lanes 546 communicate analog RF signals that are processed by the radio board processor 502 consistent with the specifications under which the signal was communicated.

The chain 1 transmit diplexer 516*b* multiplexes the data received from parallel transmitting paths at outputs of a first and second chain 1 power amplifier 532*c*, 532*d* and outputs the multiplexed signal to the second tan(switch 512. The first and second chain 1 power amplifiers 532*c*, 532*d* receive analog RF signals configured by the radio board processor 502 for wireless transmission pursuant to a selected specification understood by a client device to which the RF signals are directed. The analog RF signals are output by the radio board processor 502 on a pair of chain 1 transmitting lanes 548 connected to the first and second chain 1 power amplifiers 532*c*, 532*d*.

FIG. 6 shows a 3×3 MIMO radio board 600 that uses a radio board processor chip 602 configured to perform digital media access control ("MAC") and baseband functions of the radio as well as the analog RF functions. In an example implementation, the radio board processor 602 may be based on an Atheros AR9390 chipset. The configuration in FIG. 6 shows a radio board 600 configured for 3×3 MIMO operation. The radio board 600 supports three spatial streams 604, 606, 608 (also indicated as "Chain 0," "Chain 1," and "Chain 2" respectively) and may sustain connection rates up to 450 Mbps in an application configured for operation according to the 802.11n specification.

The three spatial streams 604, 606, 608 include corresponding first, second and third antennas 605, 607, 609. In an example implementation of the radio board 600, the three antennas 605, 607, 609 may be configured to operate as described in the '040 and the '091 applications listed above. The three antennas 605, 607, 609 each connect to corresponding tx/rx switches 610, 612, 614, respectively in FIG. 6. The tx/rx switches 610, 612, 614 may be controlled using a control connection to the radio processor 602 to control whether the radio board is receiving or transmitting data wirelessly. The radio board 600 may be configured to implement advanced features of the 802.11n specification such as maximal ratio combining, beam forming and low density parity checking. The processor interface on the Atheros AR9390 is PCI express so it plugs directly into the controller having a PCE express interface as described above with reference to both FIGS. 3 and 4.

Each tx/rx switch 610, 612, 614 connects to diplexers that multiplex or demultiplex data over two lanes in each spatial stream 604, 606, 608. For example, the first tx/rx switch 610 connects to a chain 0 receiver diplexer 616*a* for receiving data, and a chain 0 transmitter diplexer 618*a* for transmitting data. The chain 0 receiver diplexer 616*a* receives data from the first antenna 605 via the tx/rx switch 610 (when triggered to receive data). The chain 0 receiver diplexer 616*a* de-multiplexes the data received from the first antenna 605 for output along parallel paths or lanes, each lane having a first and second chain 0 low noise amplifier 620*a*, 620*b*. The first and second chain 0 low noise amplifiers 620*a*, 620*b* output the received signals along respective chain 0 receiving lanes 630 to the radio board processor 602. The chain 0 receiving lanes 630 communicate analog RF signals that are processed by the radio board processor 602 consistent with the specifications under which the signal was communicated.

The chain 0 transmitter diplexer 618*a* multiplexes the data received from parallel transmitting paths or lanes at outputs of a first and second chain 0 power amplifier 622*a*, 622*b* and outputs the multiplexed signal to the first tx/rx switch 610 for transmitting data wireless via the antenna 605 when switched to transmit. The first and second chain 0 power amplifiers 622*a*, 622*b* receive analog RF signals configured by the radio board processor 602 for wireless transmission pursuant to a selected specification understood by a client device to which the RF signals are directed. The analog RF signals are output by the radio board processor 602 on a pair of chain 0 transmitting lanes 632 connected to the first and second chain 0 power amplifiers 622*a*, 622*b*.

With respect to the second chain, chain 1, the second tx/rx switch 612 connects to a chain 1 receiver diplexer 616*b* for receiving data from the antenna 607, and a chain 1 transmitter diplexer 618*b* for transmitting data. The chain 1 receive diplexer 616*b* receives data from the second antenna 607 via the tx/rx switch 612 (when triggered to receive data). The chain 1 diplexer 616*b* demultiplexes the data received from the second antenna 607 for output along parallel paths or lanes having a first and second chain 1 low noise amplifier 620*c*, 620*d*. The first and second chain 1 low noise amplifiers 620*c*, 620*d* output received signals along respective chain 1 receiving lanes 634 to the radio board processor 602. The chain 1 receiving lanes 634 communicate analog RF signals that are processed by the radio board processor 602 consistent with the specifications under which the signal was communicated.

The chain 1 transmit diplexer 618*b* multiplexes the data received from parallel transmitting paths or lanes at outputs of first and second chain 1 power amplifiers 622*c*, 622*d* and outputs the multiplexed signal to the second tx/rx switch 612. The first and second chain 1 power amplifiers 622*c*, 622*d* receive analog RF signals configured by the radio board processor 602 for wireless transmission pursuant to a selected specification understood by a client device to which the RF signals are directed. The analog RF signals are output by the radio board processor 602 on a pair of chain 1 transmitting lanes 636 connected to the first and second chain 1 power amplifiers 622*c*, 622*d*.

With respect to the third chain, chain 2, the third tx/rx switch 614 connects to a chain 2 receiver diplexer 616*c* for receiving data from the antenna 609, and a chain 2 transmitter diplexer 618*c* for transmitting data. The chain 2 receiver diplexer 616*c* receives data from the third antenna 609 via the tx/rx switch 614 (when triggered to receive data). The chain 2 diplexer 616*c* demultiplexes the data received from the third antenna 609 for output along parallel paths or lanes having a first and second chain 2 low noise amplifier 620*e*, 620*f*. The first and second chain 2 low noise amplifiers 620*e*, 620*f* output received signals along respective chain 2 receiving lanes 638 to the radio board processor 602. The chain 2 receiving lanes 638 communicate analog RF signals that are processed by the radio board processor 602 consistent with the specifications under which the signal was communicated.

The chain 2 transmit diplexer 618*c* multiplexes the data received from parallel transmitting paths or lanes at outputs of first and second chain 2 power amplifiers 622*e*, 622*f* and outputs the multiplexed signal to the third tx/rx switch 614. The first and second chain 2 power amplifiers 622*e*, 622*f* receive analog RF signals configured by the radio board processor 602 for wireless transmission pursuant to a selected specification understood by a client device to which the RF signals are directed. The analog RF signals are output by the radio board processor 602 on a pair of chain 2 transmitting lanes 640 connected to the first and second chain 2 power amplifiers 622*e*, 622*f*.

The radio boards 500 and 600 shown in FIGS. 5 and 6 are examples of radio modules that may be implemented as the radio modules 104*a-h* and 204*a-p* in FIGS. 1 and 2 respectively. The radio boards 500 and 600 may operate in a system designed to accommodate a common form-factor as described above with reference to FIGS. 5 and 6, but in conjunction with radio cards adapted for diverse functions. For example, some number of radio cards in the system could have a single antenna chain while the remainder has dual, MIMO antenna configurations. System permutations may be created from the following variations of radio boards:

Antenna configuration (i.e. SISO, 2×2 MIMO, 2×3 MIMO, 3×3 MIMO, etc.)
Antenna types
   Directional vs. Omnidirectional
Various chip suppliers
   Qualcomm, Intel, Broadcom, Marvel, etc.
Differing transmit power capabilities
   Internal vs. External power amplifiers
Different types of RF technologies
   WiFi
      802.11 a/b/g/n/ac/ad
   Cellular
      UMTS
      HSPA
      LTE
   Bluetooth®

It is noted that the above description is not intended to be limiting in view of references to specific standards and known configurations. Rather, the modularity and flexibility provided by the radio module platforms enhances the variety of systems that may be configured.

It is also noted that example implementations of the radio modules 500 and 600 described with reference to FIGS. 5 and 6 may be configured to provide bandwidths of up to 300 Gbps and 450 Gbps, respectively. In addition, the radio modules 300 and 400 may be configured for modularity to conform to a common form factor, and where there is a size limitation, the radio modules 300 and 400 may create challenging operating environments at such high frequencies. It is to be understood by those of ordinary skill in the art that the design of components such as examples of the radio modules 300 and 400 may require performing impedance matching and transmission line analysis for the conductive path and any components between the antennas and the radio processor. The need for such techniques and analysis increases when discrete components are included in the radio chains as described above with reference to FIGS. 3 and 4. Impedance matching and transmission line analysis are known to those of ordinary skill in the art. In addition, the details involving their use will depend on design specifications and other factors relative to specific implementations.

V. High-Speed Radio Module Interface With In-Line Processing

A. Intelligent High-Speed Radio Module Interface

Figure 7:
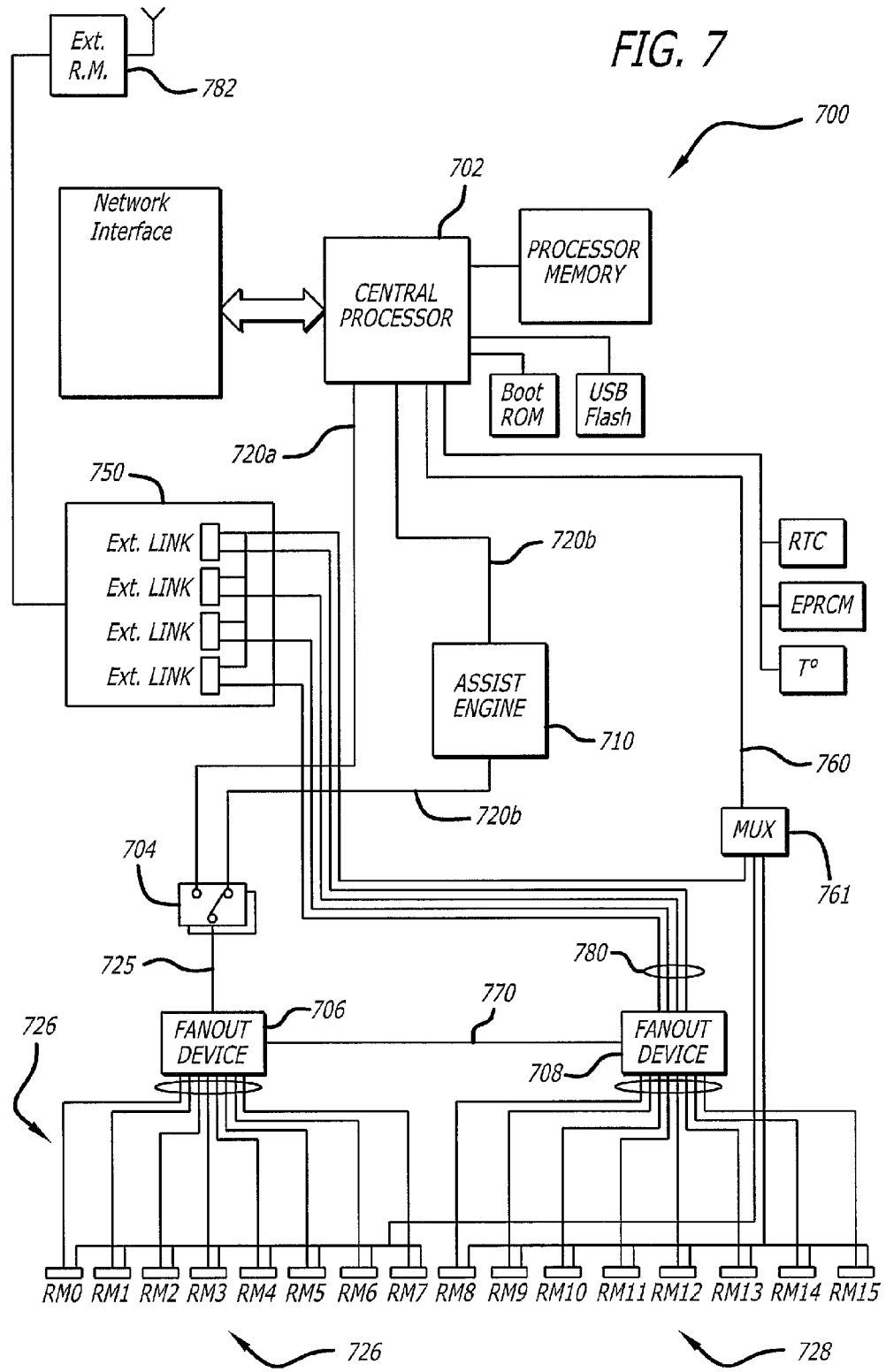
FIG. 7 is a schematic diagram of a controller that may be used in the wireless network array shown in FIG. 2.

FIG. 7 is a schematic diagram of a controller 700 that may be used in an example implementation of a wireless network access device such as an example of the wireless network access device 200 shown in FIG. 2. The controller 700 in FIG. 7 includes a controller processor 702, signal switches 704*a* and 704*b*, radio path fanout devices 706 and 708, an assist engine 710, and an external device interface 750. The devices are interconnected in a manner similar to the controller 200 described with reference to FIG. 2. The controller processor 702 communicates with up to 16 radio modules 726, 728 via a selectable radio interface path 720*a*, 720*b*, which includes a first four-lane path 720*a* and a second four-lane path 720*b* connected to the signal switches 704*a,b*. The signal switches 704*a,b* are set to select one of the two radio interface paths 720*a,b* to use as a single link to a selected one of the up to sixteen radio modules 726, 728. The first group of the up to sixteen radio modules 726 is connected to the first radio path fanout device 706 via up to eight single lane links connected to a corresponding radio module. The second group of the up to sixteen radio modules 728 is connected to the second radio path fanout device 708 via up to eight single lane links connected to a corresponding radio module. The signal switches 704*a* and 704*b* and radio path fanout devices 706, 708 may be controlled by the controller processor 702 over an integrated interface control bus 760 or via control signals forming part of the processor's control bus.

The second radio path fanout device 708 may include a fanout device coupling 770 to the first radio path fanout device 706. The fanout device coupling 770 may be a four lane link configured to permit any of the up to eight radio modules 728 connected to the second radio path fanout device 708 to connect via the first radio path fanout device 706 to the controller processor 702. The connections from the first radio path fanout device 706 to the first group of radio modules 726 may include 8 1×1 links forming 8 single lane links that are connected to one of the two four-lane links, which are the radio interface paths 720*a*, 720*b*. The second radio path fanout device 708 may also include four single lane links at 780 connected to corresponding external output ports in the external device interface 750.

The example illustrated in FIG. 7 may provide a variety of performance, diagnostic, test or function enhancing assist functions using the assist engine 710 and operating the second radio interface path 720*b* for communication to the radio modules 726, 728, or to the external devices connected to the external device interface 750. FIG. 7 shows one assist engine 710, however, multiple assist engines 710 may be configured and inserted into the radio interface path 720*b*.

In an example implementation, the assist engine 710 may be a field-programmable gate array ("FPGA") programmed with any suitable or desirable assisting function. In general, the radio interface paths 720*a*, 720*b* may be configurable by control software operating under control of the controller processor 702 to select between the two paths 720*a*, 720*b*. The controller processor 702 may select between the first radio interface path 720*a* having a direct connection to the controller processor 702 and the second radio interface path 720*b* with the assist engine 710 inserted into the path 720*b*. The assist engine 710 may be used to process data and/or control traffic in-line with the radio processing path 720*b* ("in-line processing" functions), as look-aside hardware assist engines ("look-aside processing" functions) for the controller processor 702, or as an auxiliary processor that controls communication between the controller processor 702 and one or more external devices connected to the external device interface 750.

The assist engine 710 may perform a variety of functions depending on the use case of the wireless network access device (such as 200 in FIG. 2). For example, functions that may be implemented with in-line processing performed by the assist engine 710 include, but are not limited to, the following examples:

Counting data packets
Inspecting packets for specific content and then acting on what it finds (like setting an interrupt for example).
Queuing data traffic
Policing data traffic
Memory address checking Functions that may be implemented with look-aside processing include the following:
 Encryption/Decryption
 Frame aggregation/de-aggregation
 Packet parsing
 Frame translation The assist engine 710 may include functions that use the connections 780 to the external device interface 750 for any suitable purpose. For example, the four device connections in the external device interface 750 may be used to connect to one or more external radio modules 782. The external radio modules 782 may be configured in a variety of ways. For example, the external radio module 782 may be any radio module having at least an electrical interface configured to communicate with the controller 700. The external radio module 782 may or may not have the same form factor that would allow it to operate as one of the radio modules 726, 728 configured to operate with the controller 700. The external radio module 782 may be used to provide a specialized link to specially selected clients, or clients located in a specific area. The external radio module 782 may also implement a different type of wireless communication link than the radio modules 726, 728 configured to operate with the controller 700. In another example, the external radio module 782 may not be a 'radio' module, but rather a wireless connection using a different type of wireless signal, such as infrared, laser, any optical, any electromagnetic other than radio, or any other type of wireless signal. The external radio module 782 may be implemented to expand functions, capacity, or performance, or to provide diagnostic testing.

B. High-Speed Radio Module Interface Bridge

Figure 8:
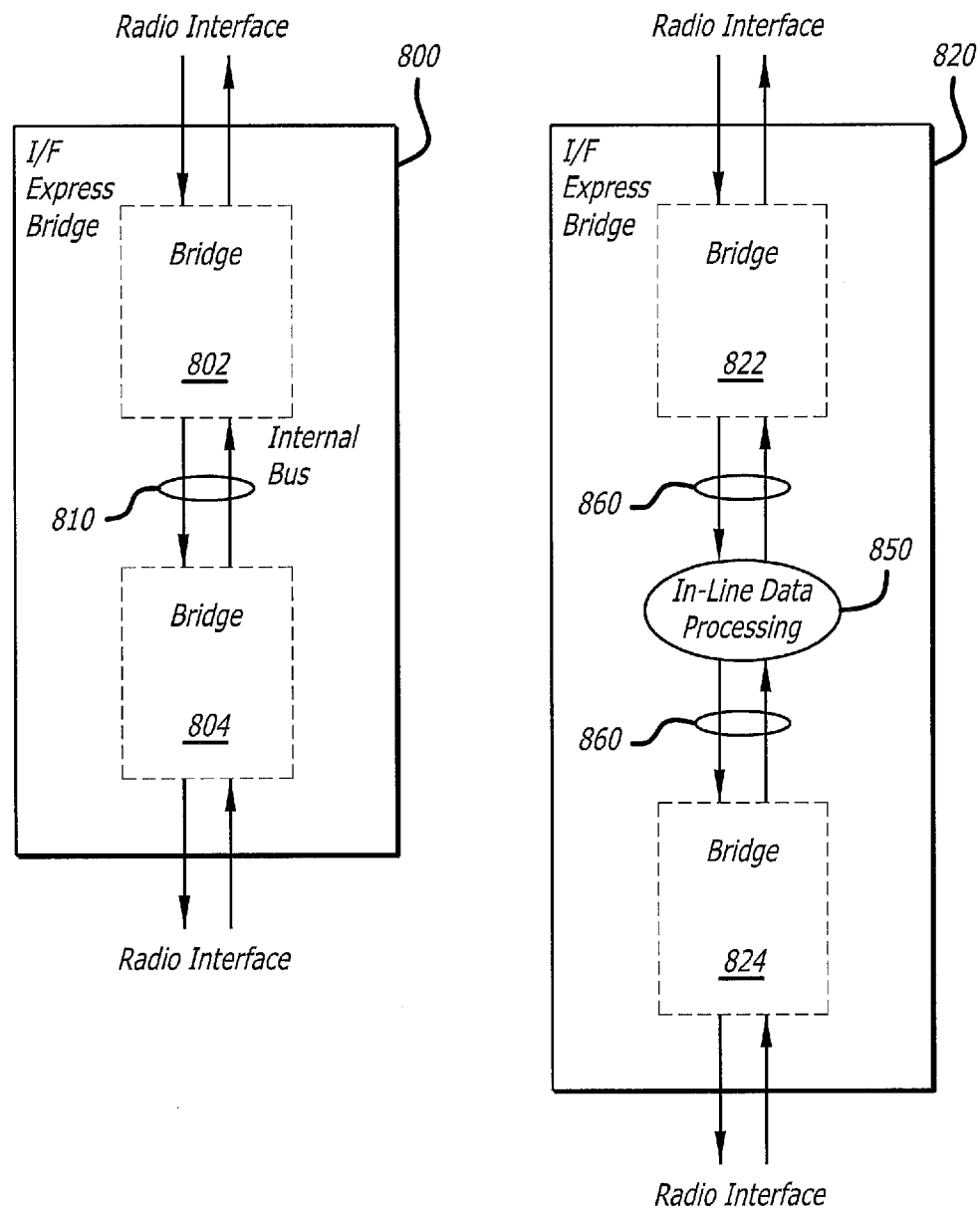
FIG. 8 illustrates operation of an example of a high-speed radio module interface bridge and an interface bridge having in-line data processing.

The assist engine 710 shown in FIG. 7 may be used to provide other types of processing assist functions other than those described above with reference to FIG. 7. For example, an assist engine 710 may be implemented as an in-line data processing function in an interface bridge. FIG. 8 illustrates operation of an example of a high-speed radio module interface bridge 800 and an interface bridge having in-line data processing 820. FIG. 8 shows a block diagram of the interface bridge 800 in normal operation utilizing a first internal interface bride 802 and a second internal interface bridge 804 connected back-to-back by an internal bus 810. The interface bridge 800 is configured to pass traffic consistent with the interface standard (PCI Express, for example) between two external interfaces.

The interface bridge having in-line data processing 820 also includes a first internal interface bridge 822 and a second internal interface bridge 824, but with an in-line data processing function 850 operating between the first and second interface bridges 822, 824 over an internal bus 860. The in-line data processing function 850 may be configured to perform any desired function. The in-line data processing function 850 intercepts the communications traffic from the external interfaces and may perform functions on the intercepted data. Examples of the types of functions that may be performed on the data include:
 Counting data packets
 Inspecting packets for specific content and then acting on what it finds (like setting an interrupt for example).
 Queuing data traffic
 Policing data traffic The interface bridge 820 with internal processing may be implemented in either custom silicon such as a standard cell chip or programmable silicon such as an FPGA.

C. Transmit/Receive Assist Functions

The assist engine 710 in FIG. 7 may also be configured to provide performance monitoring and/or boosting functions in communicating data between the controller and the radios. An example wireless network array such as the array 700 shown in FIG. 7 communicates data to be transmitted to, or data received from, client devices between the radio modules 726, 728 and the controller processor 702. The data communication may be configured on any standard or proprietary data interface system, which may employ serial or parallel links between the controller processor 702 and radio modules 726, 728 and a variety of schemes, data structures, and/or architectures. Regardless of the configuration used, the data interchange between the radio modules and the controller may negatively affect performance of wireless network arrays such as the wireless network array 700 in FIG. 7. The impact on performance increases as the bandwidth of the radio modules increases and as more radio modules are added.

The controller processor 702 and the radio modules 726, 728 in FIG. 7 implement the interchange of the data between controller processor 702 and radio modules 726, 728 by forming transmit and receive buffers on each radio module. The transmit and receive buffers contain pointers to storage space containing data to be transmitted, or memory space in which to store data received by the radio. The storage space is typically allocated and managed by the controller processor 702. The controller processor 702 may implement a process to provide pointers or suitable access information for accessing the storage space to the radio modules. For example, the controller processor 702 may implement a process for the controller to generate the access information and to provide the access information to the radio involved in the communication. The radio then stores the access information in the transmit and receive buffers. The performance of the wireless network array may degrade if the controller processor 702 is not able to provide the access information fast enough to ensure that some access information is available in the transmit and receive buffers for each radio at all times. The assist engine 710 in FIG. 7 may provide performance assurance as described below with reference to FIGS. 9A-C for data reception and FIGS. 10A-E for data transmission.

1. Assist Engine for Data Reception

Figure 9A:
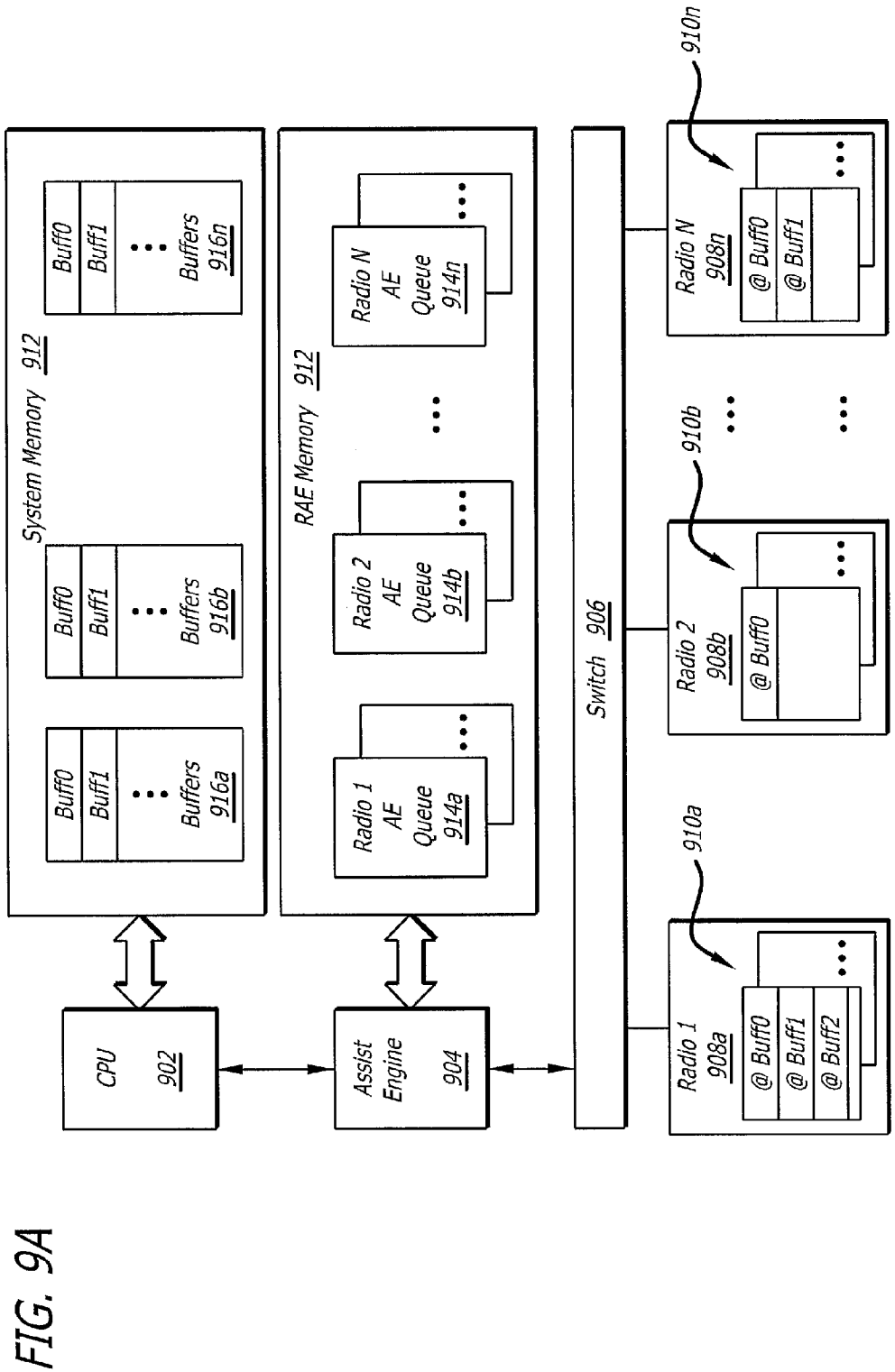
FIG. 9A is a schematic diagram of an example system for assisting reception of data packets by radios in an example wireless network array.
Figure 9B:
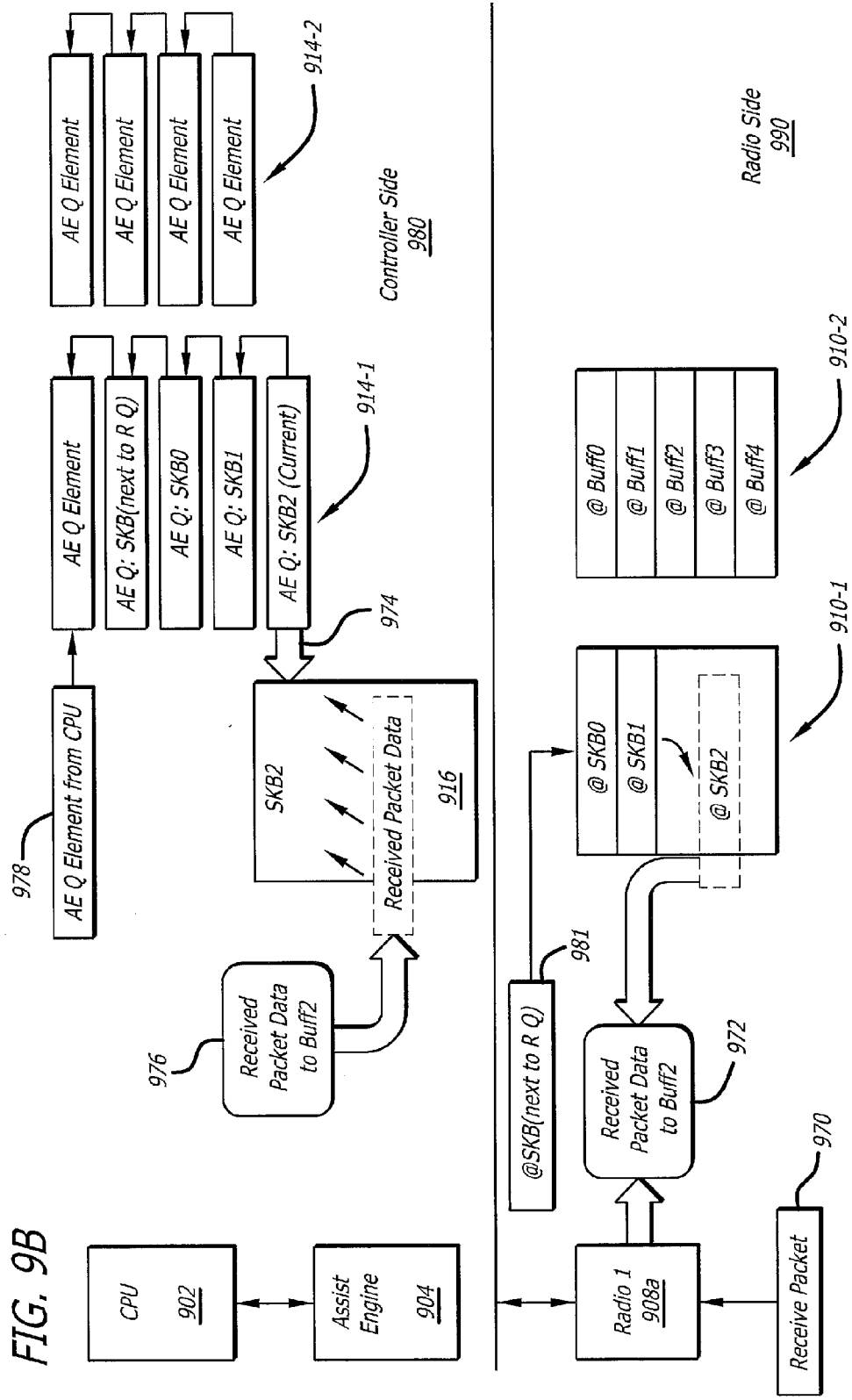
FIG. 9B is a schematic diagram illustrating operation of an example method for assisting the reception of data by a radio in the system shown in FIG. 9A.
Figure 9C:
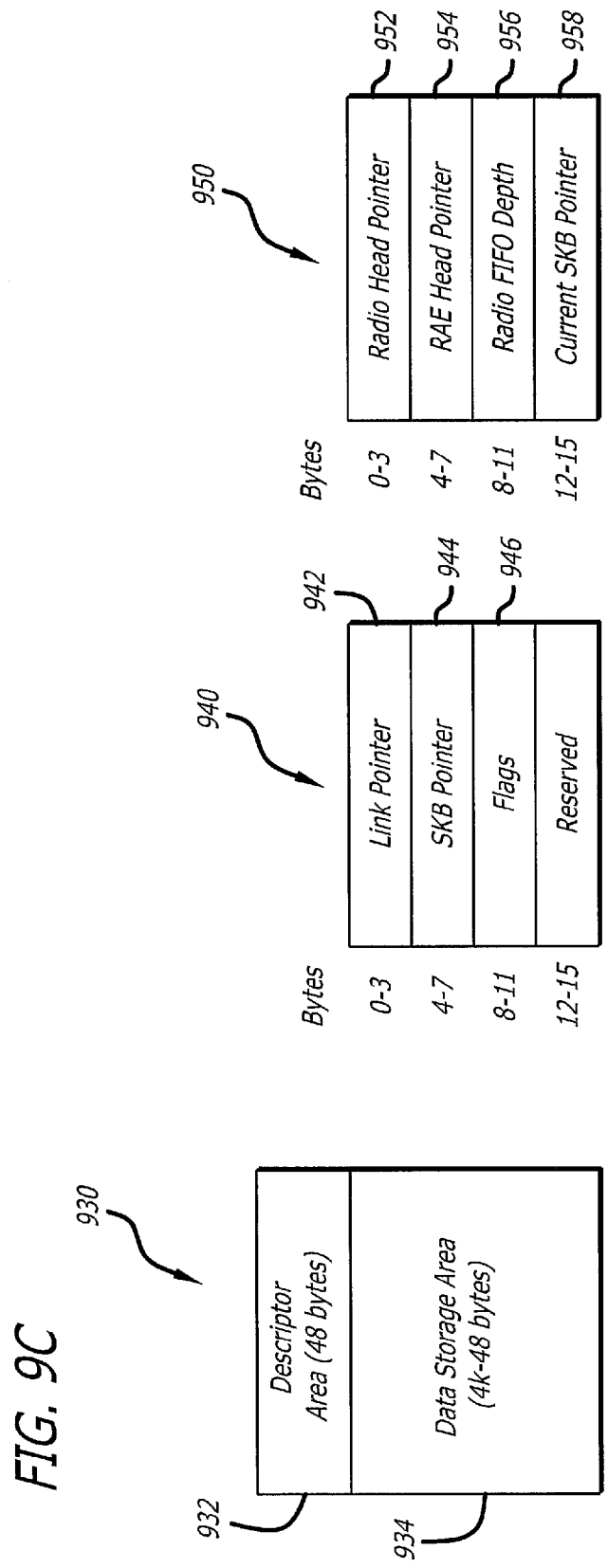
FIG. 9C shows examples of data structures that may be used in implementing an example of the method described with reference to FIG. 9B.

FIG. 9A is a schematic diagram of an example system 900 for assisting reception of data packets by radio modules in an example wireless network array. The system 900 includes the wireless network array components described above with reference to the wireless network array 700 in FIG. 7. The components include a controller processor 902, an assist engine 904, a switch 906, and up to N radio modules 908*a-n*. The controller processor 902, the assist engine 904, and the switch 906 may operate on an example of the controllers described above with reference to FIGS. 1-3. The switch 906 manages communications connections between the controller processor 902 and the radio modules 908*a-n* under the control of the controller processor 902 pursuant to a selected communications interface. The radio modules 908*a-n* may be connected to the controller as described above with reference to FIGS. 1-4 and operate modularly as independent and distinct radio modules subject to the communications interface with the controller. The system 900 in FIGS. 9A-9C is described below as including a communications interface based on the PCIe® standard. It is to be understood by those of ordinary skill in the art that any suitable standard or proprietary interface may be used.

The radio modules 908*a-n* include a plurality of radio receiving buffers 910*a-n*. In the example shown in FIG. 9A, each radio module 908*a-n* includes multiple buffers 910*a-n*. For example, radio 1 908*a* includes multiple radio receiving buffers 910*a*. Each radio module 908*a-n* may use the same or different number of radio receiving buffers 910*a-n*.

The radio receiving buffers 910a-n may be implemented as first in, first out (FIFO) buffers in which pointers, or other suitable information access elements, are stored. The controller may provide the radio module 908a-n with the information access elements for storage in the radio receiving buffers 910a-n. The controller and radio modules 908a-n may also be configured to permit direct access from the controller processor 902 on the controller to the radio receiving buffers 910a-n on the radio modules 908a-n. The information access elements may be added to the radio receiving buffers 910a-n as needed. The radio modules 908a-n receive data from client devices as signals over wireless connections. The radio processors in the radio modules 908a-n process the signals as data packets formatted for storage and eventual use by the controller processor 902 in the controller. The radio processors obtain an information access element, typically a pointer to a data storage space, from the radio receiving buffers 910a-n. When an information access element is obtained from a radio receiving buffer, the element is taken off the radio receiving buffer 910a-n leaving the radio receiving buffer 910a-n with one fewer storage options. The controller processor 902 in the controller is tasked with replacing the information access element. In a given radio receiving buffer 910-n, the information access elements may be removed successively at a high rate when experiencing a high level of data traffic at a given radio. The controller processor 902 may not be able to replace the used information access elements particularly when the controller processor 902 is operating with a large number of radio modules.

The assist engine 904 may be configured as shown in FIG. 9A to include a receiver assist engine memory 912 implemented as read-write memory (such as RAM) and logic that manages a plurality of lists, or queues referred to as assist engine ("AE") receiving queues 914 in FIG. 9A, configured to ensure that the radio receiving buffers 910a-n are supplied with sufficient information access elements. The assist engine 904 may configure, for each radio, an AE receiving queue 914a-n corresponding to each of the radio receiving buffers 910 managed by the radio. The AE receiving queues 914 include queue elements that may conform to a data structure defined to allow the queue elements to contain information about storage space that may be made available to the corresponding radio. The queue elements may include information such as an information access element, queue management information and status information. The AE receiving queue 914 may have storage configured for a predetermined number of queue elements, which may be determined by tuning or identifying by analysis or by testing how many queue elements are needed to keep the radio receiving buffers 910 sufficiently supplied with information access elements.

The assist engine 904 provides in-line processing between the controller processor 902 and the radio modules 908a-n. The assist engine 904 receives information access elements from the controller processor 902 for storage in the AE receiving queues 914, and provides information access elements to the radio modules from the AE receiving queues 914. The assist engine 904 may be further configured to monitor the status of the radio receiving buffers 910, which allows the assist engine 904 to determine when to provide information assist elements to the radio modules. When data traffic is high, the assist engine 904 may provide the information access elements more quickly than the controller processor 902, which helps ensure that the radio receiving buffers do not reach an empty state.

The controller processor 902 supplies information access elements to the assist engine 904 while allocating data storage in system memory 912 for the data received by the radio modules 908. The information access elements may provide information for accessing selected data buffers 916a-n, which may be allocated as multiple storage areas for each radio. The information access elements may be pointers, or other data structures that may include a pointer to the buffers 916a-n. When a radio reads or removes an information access element from the radio receiving buffer, the radio stores the received data packet(s) in the data buffer 916 corresponding to, or pointed to, by the information access element.

The AE receiving queues 914a-n and the management of the AE receiving queues 914a-n by the assist engine 904 may be implemented in a variety of ways. FIG. 9B is a schematic diagram illustrating operation of an example method for assisting the reception of data by a radio in the system shown in FIG. 9A. Operation of an example assist engine 904 configured to assist data reception is described below where:

1. Queues 914a-n are implemented as linked lists.
2. An information access element is a "SKB," or "socket buffer," which is known to those of ordinary skill in the art as a type of data storage element.

FIG. 9C shows examples of data structures that may be used in implementing an example of the method described with reference to FIG. 9B. FIG. 9C includes diagrams illustrating examples of data structures for an SKB 930, a receiver linked list element 940, and a receiver linked list status block 950.

The SKB 930 shown in FIG. 9C includes a descriptor area 932 and a data storage area 934. The descriptor area 932 may be 12 dwords (48 bytes) for example in the first portion of the SKB 930. The data storage area 934 of the SKB 930 holds available blocks of system memory 912 in a predetermined size. For example, the data storage area 934 may include 4 kbytes blocks of space. The memory for the SKBs 930 may be allocated in system memory 912 as the buffers 916 as shown in FIG. 9A and 9B accessible by 32-bit addresses. The radio receiving buffers 918a-n (in FIG. 9A) may be implemented as FIFOs that store the 32-bit addresses to the SKB 930.

The AE receiving queues 914a-n may be created by any available processing unit, which includes the controller processor 902 and the assist engine 904. In an example implementation, the AE receiving queues 914a-n are created by the controller processor 902 and managed by the assist engine 904. For each radio module 908, each radio receiving buffer 910 has a corresponding AE receiving queue 914 managed by the assist engine 904. For example, if radio 1 908a uses two radio receiving buffers 910a, the assist engine 904 maintains two AE receiving queues 914a, one AE receiving queue 914a for each radio receiving buffer 910a. Each AE receiving queue 914 may store elements such as a AE receiving queue element 940 shown in FIG. 9C. The AE receiving queue 914 is implemented as a linked list of AE receiving queue elements 940. The AE receiving queue element 940 includes a link pointer field 942, which may be used to create the linked list. A null value stored in the link pointer field 942 indicates the end of the list. The AE receiving queue element 940 also includes an item indicating information regarding the storage space reserved to correspond to the AE receiving queue element 940. An example item is a SKB pointer field 944 shown in the AE receiving queue element 940 in FIG. 9C, which may be implemented as a 32-bit address of the free data buffer, which is the access information, or pointer, that is to be communicated to the radio for storage in the radio receiving buffer.

The AE receiving queue element 940 includes a flags field having 2 bits. In the illustrated example, the two bits are defined as the end-of-list (EOL) detected bit and the receive-done bit. The EOL bit may be set by the assist engine 904 when a null link pointer is encountered to indicate that the end of the linked list has been reached. The EOL flag bit may be used to empirically determine how long the linked list needs to be to avoid the EOL condition. The assist engine 904 may be configured to set the receive-done bit in a given linked list element to indicate that the assist engine 904 has determined that a packet is fully buffered in the SKB 930 that is associated with the AE receiving queue element 940.

The assist engine 904 monitors the status of the AE receiving queues 914 and uses the receiver linked list status block 950 to track the state of packet reception for a corresponding AE receiving queue 914. The receiver linked list status block 950 includes the following status elements:
1. a radio head pointer 952, which identifies the AE receiving queue element 940 corresponding to the SKB 930 allocated to store the next packet received by the radio.
2. a RAE head pointer 954, which identifies the AE receiving queue element 940 corresponding to the next SKB 930 that will be used by the radio for storage in the radio receiving buffer 910.
3. a depth field 956, which indicates the number of SKBs that are currently stored in the receiver data buffer 910.
4. a current SKB pointer 958, which identifies the SKB 930 allocated to store the next packet received by the radio.

The assist engine 904 monitors the status of the data reception by polling, snooping, or performing other suitable state-tracking mechanisms to track the accesses to the SKB identified in the current SKB pointer 958 in order to determine when the data- and descriptor-writes are complete. The completion of the data- and descriptor-writes triggers the assist engine 904 to set, or write, the receive-done bit in the corresponding AE receiving queue element 940 (for example, the linked list element identified in the radio head pointer 954) and to write the next available SKB (given in the RAE head) to the radio receiving buffer 910.

Referring to FIG. 9B, the controller processor 902 and the assist engine 904 are depicted on a controller side 980, and the radio 1 908a is depicted on a radio side 990 of an example of the system 900 shown in FIG. 9A. The radio 1 908a has two radio receiving buffers 910-1 and 910-2. The controller processor 902 accesses system memory 912 (in FIG. 9A), which contains a buffer 916 labeled 'SKB2.' The buffer 916 is for purposes of this description, an example of the SKB 930 described above with reference to FIG. 9C. The assist engine 904 in FIG. 9B manages a first radio 1 AE receiving queue 914-1 and a second radio 1 AE receiving queue 914-2, which are examples of the AE receiving queues 914a-n described above with reference to FIG. 9A. The first radio 1 AE receiving queue 914-1 and second radio 1 AE receiving queue 914-2 for this example are implemented as receiver linked lists containing linked list elements having the data structure of the AE receiving queue element 940 described above with reference to FIG. 9C. The first radio 1 AE receiving queue 914-1 corresponds to the first radio receiving buffer 910-1 in radio 1 908a. The second radio 1 AE receiving queue 914-2 corresponds to the second radio receiving buffer 910-2 in radio 1 908a.

The example shown in FIG. 9B schematically illustrates a received packet received by radio 1 908a at 970. Radio 1 908a receives the received packet as a signal transmitted wirelessly by a client device and processes the signal to generate the received packet. Radio 1 908a obtains a radio receiving buffer element from the first radio receiving buffer 910-1. The radio receiving buffer element is an element labeled '@SKB2,' which may be a pointer to SKB2, or data structure having information for accessing SKB2, on the controller side 980. Radio 1 908a stores the received packet data in the storage space identified by 'SKB2' at 972.

On the controller side 980, the storage of the received packet in 'SKB2' is reflected at 976. The assist engine 904 manages the receive linked list elements stored in the radio 1 AE receiving queue 914-1. The radio 1 AE receiving queue 914-1 includes the following AE receiving queue elements:
  AE receiving queue Element: SKB2—a linked list element corresponding to SKB2,
  AE receiving queue Element: SKB1—a linked list element corresponding to SKB1,
  AE receiving queue Element: SKB0—a linked list element corresponding to SKB0,
  AE receiving queue Element: SKB (next to buffer)—a linked list element corresponding to the next SKB to be put in radio data buffer,
  AE receiving queue Element It is to be understood by those of ordinary skill in the art that the state of the data structures shown in FIG. 9B is a snapshot in time of what can be a dynamic system. The snapshot represents the state of the system as the received packet is being stored in SKB2 by the radio module 908a, and the state of the linked list status block 950 for the first radio AE receiving queue 914-1 is as shown in Table 1 below.

TABLE 1

| Status Element | Current Value |
| --- | --- |
| Radio Head Pointer | Pointer to AE receiving queue Element: SKB2 (Current) |
| RAE Head Pointer | Pointer to AE receiving queue Element: SKB (next to buffer) |
| Radio FIFO Depth | 3 |
| Current SKB Pointer | @SKB2 |

Given the state reflected by the values of the linked list status block 950 shown in Table 1, the receiver linked list element 974 in this example is the current linked list element as indicated by the Radio Head Pointer. The current linked list element 974 corresponds to SKB2, which is the SKB that the radio module 908a will use, or is using, for storing the received data packet 970. The current linked list element 974 is linked to the next linked list element, which is the element labeled 'AE receiving queue Element: SKB1.' The link to AE receiving queue Element: SKB1 is indicated in the link field 942 (in FIG. 9C) of the current linked list element 974. Similarly, the link field 942 (in FIG. 9C) of the linked list element labeled 'AE receiving queue Element: SKB1' indicates a link to the next element, 'AE receiving queue Element: SKB0.' The assist engine 904 configures the first AE receiving queue 914-1 to continue the link to subsequent elements as indicated by the curved arrows next to the elements.

The RAE Head Pointer in the linked list status block 950 shown in Table 1 is a pointer to AE receiving queue Element: SKB (next to buffer), which is the linked list element corresponding to the next SKB to be added to the radio receiving buffer 910-1 on the radio side 990. The Radio Buffer Depth is set to 3 to indicate that @SKB0, @SKB1, and @SKB2 are stored in the radio receiving buffer 910-1 of radio 1 908a. The Current SKB Pointer is @SKB2 to indicate that the next radio packet will be, or is being, stored in SKB2.

The assist engine 904 monitors the status of the SKB 916 by polling or snooping, or otherwise checking whether the storage of the received data has completed. The assist engine 904 may monitor the status by detecting when the descriptor field 932 of the current SKB 974 ('SDB2' as indicated by the current SKB pointer in Table 1) has been written. While checking for completion of the storage of the received data, the assist engine 904 determines the next linked list element corresponding to the next SKB to be used by the radio 1 908a for the next packet by referring to the link field 942 (in FIG. 9C) of the current linked list element (AE receiving queue Element: SKB2 (current)). The next linked list element is AE receiving queue Element: SKB1 in the example illustrated in FIG. 9B.

When the storage of the received packet data in SKB2 has completed, the assist engine 904 sets the Receive-Done bits at 904 (in FIG. 9C) of the current linked list element LLE: SKB2 (Current). The current linked list element AE receiving queue Element: SKB2 (Current) is thus made available to the controller processor 902 for use with a new SKB. The pointer to the AE receiving queue Element: SKB1 linked list element is written to the Radio Head Pointer 952 (in FIG. 9C) of the linked list status block 950.

The assist engine 904 also determines the next SKB pointer to add to the radio receiving buffer 910-1 of the radio module 908a by reference to the link field 942 (in FIG. 9C) of the linked list element AE receiving queue Element: SKB (next to buffer) identified in the RAE Head Pointer of the linked list status block 950. The pointer to the next SKB, @SKB (next to buffer), is provided to the radio module 908a for storage as shown at 981 on the radio side 990. The link field value in the linked list element AE receiving queue Element: SKB (next to buffer) points to the next linked list element to be used to add an SKB to the radio receiving buffer 910-1. The link field value for AE receiving queue Element: SKB (next to buffer) is a pointer to AE receiving queue Element, which is then written to the RAE Head Pointer 954 (in FIG. 9C) in the linked list status block 950. After the linked list status block 950 is updated for the new current linked list element, the linked list status block 950 is as shown in Table 2 below:

TABLE 2

| Status Element | Current Value |
|---|---|
| Radio Head Pointer | Pointer to AE receiving queue Element: SKB1 |
| RAE Head Pointer | Pointer to AE receiving queue Element |
| Radio FIFO Depth | 3 |
| Current SKB Pointer | @ SKB (next to buffer) |

It is noted that if the assist engine 904 is not generating a sufficiently long linked list, an End-Of-List condition may be detected when the link field value of the linked list element identified by the RAE Head Pointer is null. This condition may be avoided by prior testing and analysis of the performance of the system to adjust the number and size of buffers and queues used for receiving data. It is noted as well that the Radio FIFO Depth value in the linked list status block 950 did not change when a new SKB was added pursuant to the removal of an SKB. Depending on the amount of data being received by the radio module 908a at any given time, the assist engine 904 may be able to provide SKBs to the radio module 908a as the radio module 908a uses the SKBs in the radio receiving buffer, thus keeping the Radio FIFO Depth consistently unchanged. In an example implementation, the assist engine 904 fills the radio receiving buffers 910 with SKBs during initialization of the system 900 before data reception and transmission has begun ensuring that the radio receiving buffers 910 can be filled before data can be received. After the system 900 has initialized, each radio module 908a-n is serviced in a round robin fashion. If the assist engine 904 detects that a packet was received into an SKB, a new SKB is added to the radio receiving buffer 910 to replace it in the same round-robin interval assuming the end of the linked list has not been reached. In the example implementation, one packet is processed per radio in each round-robin interval, and the round-robin interval determines the maximum rate at which SKBs can be provided to the radio receiving buffers 910a-n. In periods of high input traffic to the radio module 908a, the Radio FIFO Depth may decrease. By selecting suitable buffer and queue sizes, the likelihood of emptying any one radio receiving buffer 910 may be minimized.

2. Assist Engine for Data Transmission

Figure 10A:
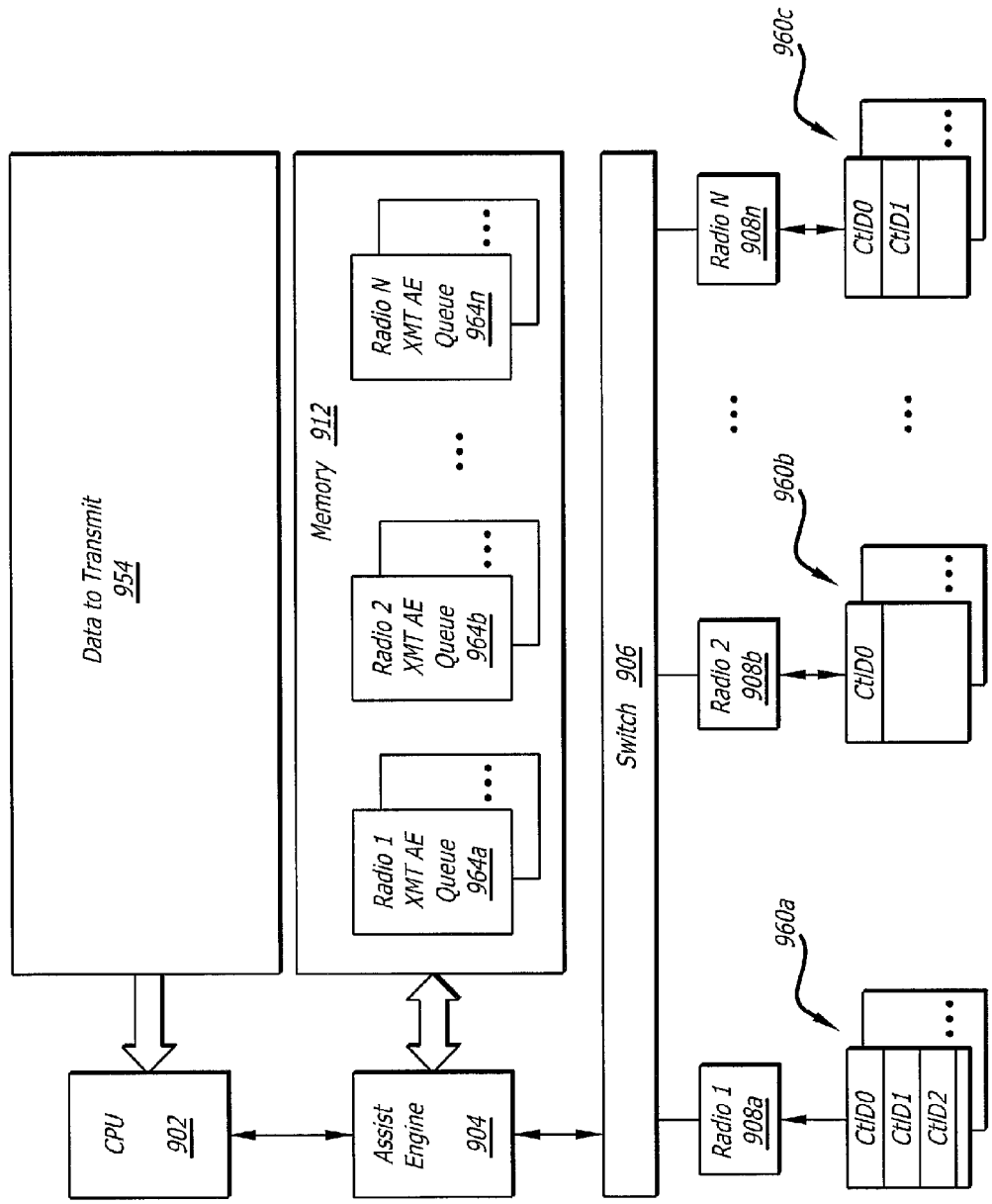
FIG. 10A is a schematic diagram of an example system for assisting transmission of data packets by radios in an example wireless network array.

FIG. 10A is a schematic diagram of an example system 1000 for assisting transmission of data packets by radio modules in an example wireless network array. The system 1000 includes the wireless network array components described above with reference to the wireless network array 700 in FIG. 7. The components include a controller processor 902, an assist engine 904, a switch 906, and up to N radio modules 908a-n. The controller processor 902, the assist engine 904, and the switch 906 may operate on an example of the controllers described above with reference to FIGS. 1-3. The switch 906 manages communications connections between the controller processor 902 and the radio modules 908a-n under the control of the controller processor 902 pursuant to a selected communications interface. The radio modules 908a-n may be connected to the controller as described above with reference to FIGS. 1-4 and operate modularly as independent and distinct radio modules subject to the communications interface with the controller. The system 1000 in 10A-10E is described below as including a communications interface based on the PCIe® standard. It is to be understood by those of ordinary skill in the art that any suitable standard or proprietary interface may be used.

The radio modules 908a-n include a plurality of radio transmit buffers 960a-n. In the example shown in FIG. 10A, each radio module 908a-n includes multiple radio transmit buffers 960a-n. For example, radio 1 908a includes multiple radio transmit buffers 960a. Each radio module 908a-n may use the same or different number of radio transmit buffers 960a-n. The multiple radio transmit buffers 960a-n may be implemented as First-in, First-out (FIFO) buffers, and may be used to implement multiple priority levels for data transmission. In an example implementation, the radio module 908a-n may be provided with 10 FIFO queues that are each 8 entries deep.

The assist engine 904 manages multiple assist engine ("AE") transmit queues 964a-n per radio module 908a-n. The assist engine 904 manages the AE transmit queues 964a-n with the objective of keeping each FIFO radio transmit buffer 960a-n in non-empty state as long as there are packets available to send.

In operation, the controller processor 902 configures data packets to transmit to client devices being serviced by the radio modules 908a-n as data to transmit 954. The data to transmit 954 is communicated over the PCIe bus connection to the switch 906 where it is subject to in-line processing by the assist engine 904. The assist engine 904 configures AE transmit queues 964a-n corresponding to elements of the data to transmit 954. For example, the data to transmit 954 may be provided a packet at a time, or multiple packets at a time, which may be stored in memory. Information about the packets, which may include the memory location in which they are stored, their destination, their size, their priority, and any other suitable information, may be provided or packaged by the assist engine 904 as "control descriptors." The control descriptors are the elements of data that are stored in the radio transmit buffers 960a-n where they wait to be retrieved and transmitted by the radio module 908a-n. A control descriptor may correspond to data packets provided as "aggregate packets," which are, for example, multiple MAC layer packets with a single PHY header. The control descriptor for aggregate packets may point to additional control descriptors that also point to data packets.

The assist engine 904 provides the control descriptors to the radio for storage on the radio transmit buffers 960*a-n* providing the radio module 908*a-n* with information (such as a pointer) regarding the data to be transmitted. The process of managing the AE transmit queues 964*a-n* to provide control descriptors to keep the radio transmit buffers 960*a-n* in a non-empty state may be implemented by the assist engine 904 using a plurality of data structures. Examples of data structures that may be used by the assist engine 904 are described with reference to FIGS. 10C-10E.

Figure 10C:
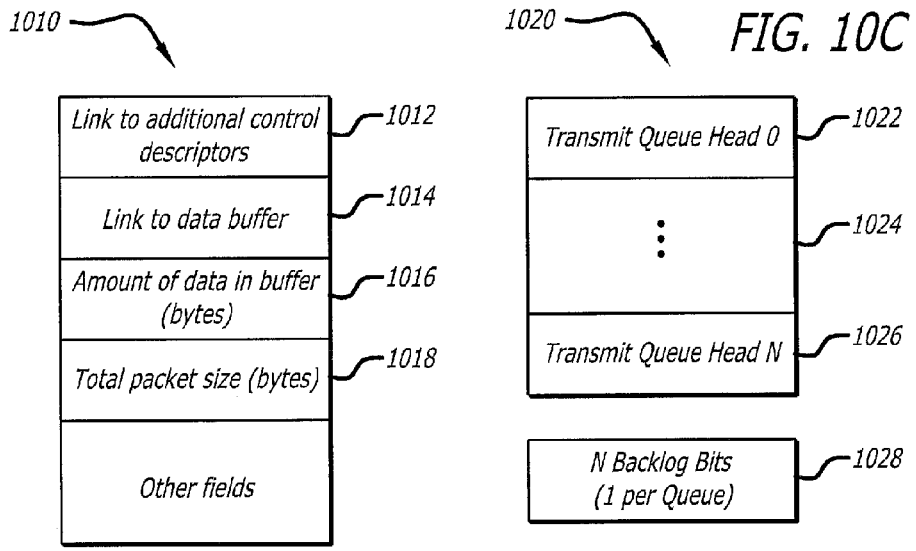
FIGS. 10C-10E show examples of data structures that may be used in implementing an example of the method described with reference to FIG. 10B.
Figure 10D:
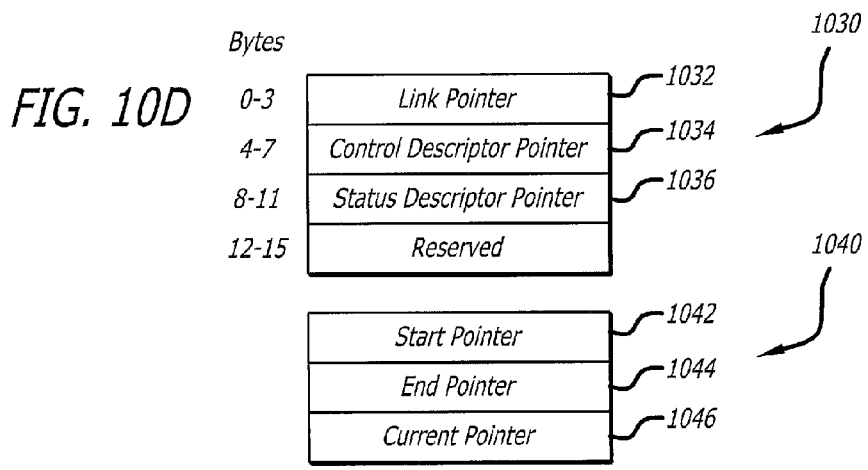
Figure 10E:
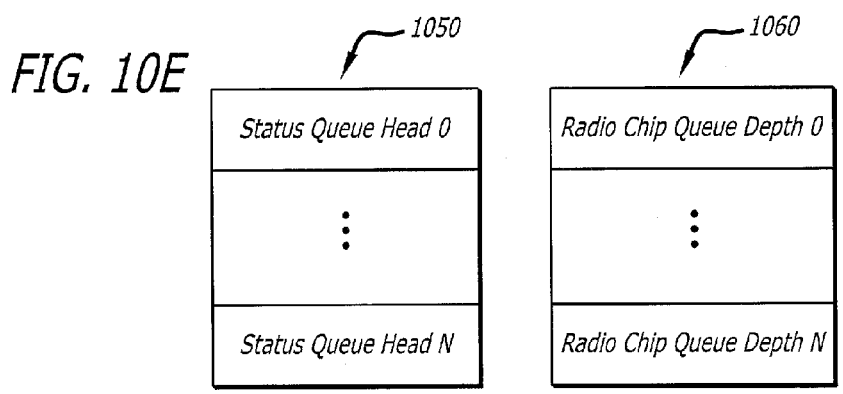

FIG. 10C illustrates diagrams for an example of a data structure for a control descriptor 1010 and an AE transmit queue state 1020. FIG. 10D depicts diagrams of example data structures for an AE transmit queue element 1030 and an AE transmit status ring 1040. FIG. 10E depicts diagrams of example data structures for a status linked list head 1050 and a radio transmit buffer depth state 1060.

Referring to FIG. 10C, the control descriptor structure 1010 includes a link to additional control descriptors 1012, a link to the data buffer in system memory containing the data to be transmitted 1014, an amount of data bytes in the buffer 1016, and a total packet size 1018. Other fields may be added depending on specific implementations of the example shown in FIG. 10C. The AE transmit queue state 1020 stores the head (a pointer for example) of each AE transmit queue in a plurality of queue heads 1022, 1024, 1026, and a backlog bit corresponding to each AE transmit queue per radio. For example, the radio module 908*a* may operate using 10 radio transmit buffers 960*a* that are each 8 elements deep. For each of the 10 radio transmit buffers 960*a*, the assist engine 904 manages 10 AE transmit queues 964*a* for which the AE transmit queue state 1020 stores the head (pointer) of each of the 10 AE transmit queues at 1022, 1024, 1026 such that N=10. A total of N=10 backlog bits are also managed at 1028.

In operation, when an available AE transmit queue element, which may have a structure described below with reference to FIG. 10D, is provided for storage in an empty AE transmit queue (that is, an AE transmit queue with no valid entries), the transmit queue head 1022, 1024, 1026 for the corresponding AE transmit queue will be set to the pointer to the AE transmit queue element being provided. In addition, the backlog bit corresponding to AE transmit queue that contains the available AE transmit queue element will be set. If the backlog bit is already set when the pointer to the linked list element is provided, the transmit queue head 1022, 1024, 1026 is not updated and the pointer to the AE transmit queue element being provided will eventually be accessed through a link in the previous linked list AE transmit queue element that was added to the AE transmit queue.

When there are no linked list AE transmit queue elements in the AE transmit queue, and a new element is added, the backlog bit is set and the AE transmit queue pointer becomes the beginning of the linked list that forms the AE transmit queue. If only one AE transmit queue element in the linked list of the corresponding AE transmit queue is used, the backlog bit is set and then cleared as soon as the last AE transmit queue element is removed from the AE transmit queue.

Referring to FIG. 10D, the transmit queue element structure 1030 includes a link pointer or link field 1032, a control descriptor pointer 1034, and a status descriptor pointer 1036. The link field 1032 is used to create the linked list and points to the next linked list element in the AE transmit queue 964. A null value in the link field 1032 indicates the end of the list.

The control descriptor pointer 1034 points to a packet to be transmitted and is pushed onto one of the radio transmit buffers 960 by the assist engine 904. The status descriptor pointer 1036 points to an area of memory to be used by the assist engine 904 to store (and thereby communicate) the transmit completion status after a packet is transmitted by the radio module 908.

The assist engine 904 may manage a status ring having the status ring structure 1040 in FIG. 10D for each radio module 908*a-n*. In an example implementation, the status ring 1040 may reflect the same structure of a status ring programmed into the radio module 908*a-n*. The status ring 1040 may be a block of contiguous memory that is divided into sub-blocks to hold the transmit completion status of each packet that is transmitted by the radio module 908*a-n*. The sub-blocks in an example implementation are 9 dwords (36 bytes) in size. The sub-blocks are organized to have a start pointer 1042, an end pointer 1044, and a current pointer 1046. The status ring 1040 corresponds to the radio module 908*a*. The sub-blocks referenced by the status ring pointers 1042, 1044, 1046 may refer to data packets being transmitted by any of the radio transmit buffers 960 corresponding to the radio module 908*a*.

At initialization, the start pointer 1042 and current pointer 1046 are set to the same value and address the same sub-block. When transmit completion status is written to the current pointer 1046, the current pointer 1046 is incremented by the size of the sub-blocks (for example, 9 dwords). When the current pointer 1046 and end pointer 1044 become equal and transmit completion status is written to the area indicated by the current pointer 1042 (and end pointer 1044 in this case), the current pointer 1046 will be set back to the start pointer 1042.

Referring to FIG. 10E, the status linked list head 1050 stores the head (or pointer) of a linked list of elements that store the status descriptors that are used when the transmission of the transmit packets pending in the radio transmit buffer has completed. The status linked list head 1050 contains the head of a status linked list for each radio transmit buffer 960. In an example implementation, the status linked lists indicated for the radio transmit buffers 960 is the same as the AE transmit queues 964 used to push control descriptors down to the radio transmit buffers 960. That is, for a given radio transmit buffer 960, the assist engine 904 follows the AE transmit queue 964 to first push control descriptors down to the radio transmit buffer 960. The assist engine 904 then follows the same AE transmit queue 964 (referred to as the 'status linked list' for the operation of the status linked list head 1050 in FIG. 10E) after the transmit completion status comes back from the radio module 908 to obtain a corresponding status descriptor 1036 (in the AE transmit queue element 1030 in FIG. 10C) in which to place the completion status data.

The radio transmit buffer depth state 1060 is used by the assist engine 904 to keep track of the queue depths of each radio transmit buffer 960. The radio transmit buffers 960 in an example implementation store a maximum of 8 control descriptors in each of the 10 radio transmit buffers 960. The assist engine increments the depth of a given radio transmit buffer 960 when a control descriptor is pushed on to the radio transmit buffer 960. When transmit complete status is received from the radio module 908 for that same radio transmit buffer 960, the assist engine 904 decrements the queue depth in the slot in the transmit buffer depth state 1060 that corresponds to the given radio transmit buffer 960. The assist engine 904 will not push additional control descriptors on to a radio transmit buffer 960 that already has a maximum number of control descriptors outstanding It is noted that the AE transmit queues 964 are managed to ensure that the radio transmit buffers 960 are not empty of control descriptors as long as the controller processor 902 has packets to send for the corresponding radio module 908. If there are no packets to send via a given radio module 908, the radio transmit buffer 960 for that radio module 908 may be empty and there may be no linked list elements in the AE transmit queue 964 corresponding to the empty radio transmit buffers 960. When a substantial number of data packets are prepared by the controller processor 902 for transmission via a given radio module 908, the radio module 908 may transmit the data from the control descriptors in its radio transmit buffers 960 faster than the controller processor 902 can provide control descriptors for data that is ready to be transmitted. The AE transmit queues 964 are managed to keep the radio transmit buffers 960 in a non-empty state by maintaining ready-to-transmit control descriptors to push to the radio transmit buffers 960 during times when the controller processor 902 would otherwise be unable to push the control descriptors.

FIG. 10B is a schematic diagram illustrating operation of an example method for assisting transmission of data from a radio in the system shown in FIG. 10A. The following description references the data structures described above with reference to FIGS. 10C-10E. For purposes of illustration, the example illustrates transmission of data by radio 1 908a. Operation of the system 1000 is described in the context of an example of the state of two AE transmit queues 964-1, 964-2, two radio transmit buffers 960-1, 960-2, and examples of data structures described with reference to FIGS. 10C-10E. The first AE transmit queue 964-1 is managed to provide control descriptors to the first radio transmit buffer 960-1. The second AE transmit queue 964-2 is managed to provide control descriptors to the second radio transmit buffer 960-2. The data transmission described involves the control descriptors in the first radio transmit buffer 960-1 as illustrative of the process involving any of the other radio transmit buffers 960.

In the state of the system 1000 as shown in FIG. 10B, the first radio transmit buffer 960-1 contains three control descriptors CtlD0, CtlD1, CtlD2, and the first AE transmit queue 964-1 contains three AE transmit queue elements. The radio module 908a transmits data packets from control descriptors in the radio transmit buffer 960-1 as long as the radio transmit buffer 960-1 contains control descriptors. The radio module 908a retrieves the next control descriptor, control descriptor CtlD2, to be transmitted from the radio transmit buffer 960-1 at 1070. The radio module 908a retrieves the data corresponding to the control descriptor CtlD2 and transmits the data packet at 1074.

On the controller side 980, the controller processor 902 may have a new data packet packaged in a control descriptor with data to transmit via radio module 908a. The control descriptor is placed in an AE transmit queue element 1030 (in FIG. 10D) by setting the control descriptor pointer 1034 (in FIG. 10D) with the pointer to the control descriptor, and the status descriptor pointer 1036 (in FIG. 10D) with the pointer to the area in which the transmit completion status will be written. The link field 1032 of the AE transmit queue element 1030 is set to null. The link field of the previous AE transmit queue element to be added to the AE transmit queue is updated to include the pointer of the next AE transmit queue element 1030 assuming the previous AE transmit queue element has not been fully processed.

The controller processor 902 pushes the new transmit linked list element on to the AE transmit queue 964-1 at 1030 in FIG. 10B. The AE transmit queue 964-1 in FIG. 10B is not empty. Therefore, the backlog bit for the AE transmit queue 964-1 is already set, and the transmit queue head already contains the pointer to the AE transmit queue head, or pointer to the initial linked list element. If the AE transmit queue 964-1 was empty and the backlog bit was clear before the linked list element was created at 1080, the assist engine 904 would update the transmit queue head and backlog bit corresponding to the first AE transmit queue 964-1 in the AE transmit queue state 1020.

When the backlog bit is set, either by the new linked list element at 1080 or by a previous linked list element in the AE transmit queue 964-1, the backlog bit is detected by the assist engine 904. If the corresponding radio transmit buffer 960-1 is not filled at its maximum level, the assist engine 904 pops the next linked list element off the AE transmit queue 964-1 at 1082 and loads the control descriptor corresponding to the AE transmit queue element on the radio transmit buffer 960-1 at 1084. The backlog bit is not cleared until the AE transmit queue 964-1 is left empty. In the example in FIG. 10B, the AE transmit queue 964-1 has three more linked list elements (including the new linked list element added at 1080).

When the control descriptor is added to the radio transmit buffer 960-1 at 1084, the assist engine 904 increments the depth of the radio transmit buffer 960-1 in the transmit buffer depth state 1060 (in FIG. 10E). Since there is at least one packet being transmitted by the radio module 908a, the assist engine 904 begins polling or snooping the transmit-done bit in the status ring addressed by the current status pointer 1046 (in FIG. 10D). When the transmit-done bit is set, the assist engine 904 retrieves the data referenced by the current status pointer 1046 to determine the AE transmit queue 964 that is associated with the data transmitted at the setting of the transmit-done bit. The assist engine 904 reads the status linked list head from the status linked list head 1050 corresponding to the AE transmit queue 964 corresponding to the transmitted data. The assist engine 904 reads the status descriptor pointer from the status linked list element. The full 9 dwords of status data from the current status pointer area 1046 are transferred to the status descriptor area and the transmit-done bit in the current status pointer 1046 is cleared. The current status pointer 1046 is then incremented to point to the next entry. The assist engine 904 decrements the depth of AE transmit queue 964 corresponding to the transmitted data in the linked list depth state area 1060.

It will be understood that the foregoing description of numerous implementations has been presented for purposes of illustration and description. It is not exhaustive and does not limit the claimed inventions to the precise forms disclosed. For example, the above examples have been described as implemented according to IEEE 802.11an and 802.11bgn. Other implementations may use other standards. In addition, examples of the wireless access points described above may use housings of different shapes, not just round housing. The number of radios in the sectors and the number of sectors defined for any given implementation may also be different. Modifications and variations are possible in light of the above description or may be acquired from practicing the invention. The claims and their equivalents define the scope of the invention.

What is claimed is:

1. A wireless network access device comprising:
    a radio interface comprising a serial communication line, a switch, and M serial connections to M connectors for connecting up to M corresponding detachable radio modules, the radio interface configured to form up to M individually addressable radio communications paths via the switch;

each radio module comprising a radio configured to communicate with client devices in a corresponding coverage area and a radio processor configured to manage at least one radio receiving buffer configured to store receiver buffer identifiers, each receiver buffer identifier identifying a corresponding received data space, the radio processor configured to store a next received data packet in the received data space corresponding to a current receiver buffer identifier and to identify a next receiver buffer identifier as the current receiver buffer identifier;

a network interface configured to provide data network access;

a processor configured to manage communication between the client devices that communicate with the radio modules and a data network via the radio interface and the network interface when N radio modules are connected to the radio interface, where N<=M;

N receive buffers in a system memory corresponding to the N connected radio modules, each receive buffer comprising a plurality of receiver buffer identifiers identifying the received data spaces in system memory designated for storing received data from the corresponding radio module, the processor configured to communicate a next-in-queue receiver buffer identifier to a selected one of the N radio modules after the selected one of the N radio modules has used the current receiver buffer identifier to store a received data packet;

an assist engine connected in the serial connection between the processor and the switch, the assist engine configured to receive the next-in-queue receiver buffer identifier, to store the next-in-queue receiver buffer identifier in an assist engine receive queue corresponding to the selected one of the N radio modules, and to communicate a next-to-radio receiver buffer identifier to the selected one of the N radio modules from the assist engine receive queue.

2. The wireless network access device of claim 1 where the assist engine is configured:

to generate an assist engine receive queue element for storing the next-in-queue receiver buffer identifier received from the processor and receiver queue management information, to add the assist engine receive queue element to the assist engine receive queue, the assist engine receive queue comprising a plurality of assist engine receive queue elements containing queued receiver buffer identifiers to be sequentially provided to the selected one of the N radio modules starting with a next-to-radio assist engine receive queue element, to communicate a next-to-radio receiver buffer identifier in the next-to-radio assist engine receive queue element, and to determine another next-to-radio assist engine receive queue element according to the receiver queue management information.

3. The wireless network access device of claim 2 where the assist engine is configured:

to generate the assist engine receive queue as a linked list of assist engine receive queue elements where the receiver queue management information in each assist engine receive queue element includes an identifier to a next linked list and the assist engine includes a linked list status block.

4. The wireless network access device of claim 3 where the assist engine is configured:

to generate multiple assist engine receive queues as linked lists of fixed length queues.

5. The wireless network access device of claim 1 where:

the received data spaces identified by the received buffer identifiers are socket buffers; and the received buffer identifiers are pointers to the socket buffers.

6. The wireless network access device of claim 1 where:

the at least one radio receiving buffer in each radio module is configured to have a fixed number of receive buffer entries, and the radio processor generates additional radio receiving buffers as each at least one radio receiving buffer is filled.

7. The wireless network access device of claim 1 where:

the at least one radio receiving buffer in each radio module is configured to have a fixed number of receive buffer entries, and the radio processor generates a number of the at least one radio receiving buffer based on an expected input traffic.

8. The wireless network access device of claim 1, where:

the radio processor in the radio module is further configured to manage at least one radio transmit buffer configured to store transmit data buffer identifiers, each transmit data buffer identifiers identifying a corresponding data space containing data to be transmitted, the radio processor configured to retrieve a next data packet to transmit from the data space corresponding to a current transmit data buffer identifier and to identify a next transmit data buffer identifier as the current transmit data buffer identifier;

the wireless network access device further comprising N transmit buffers in a system memory corresponding to the N connected radio modules, each transmit buffer comprising a plurality of transmit data buffer identifiers identifying the data spaces in system memory containing data to be transmitted by the corresponding radio module, the processor configured to communicate a next-in-queue transmit data buffer identifier to a selected one of the N radio modules after the selected one of the N radio modules has used the current transmit data buffer identifier to transmit the corresponding data packet;

where the assist engine is configured:

to receive the next-in-queue transmit data buffer identifier, to store the next-in-queue transmit data buffer identifier in an assist engine transmit queue corresponding to the selected one of the N radio modules, and to communicate a next-to-radio transmit data buffer identifier to the selected one of the N radio modules from the assist engine transmit queue.

9. The wireless network access device of claim 8, where the assist engine is configured:

to generate an assist engine transmit queue element for storing the next-in-queue transmit data buffer identifier received from the processor and transmitter queue management information, to add the assist engine transmit queue element to the assist engine transmit queue, the assist engine transmit queue comprising a plurality of assist engine transmit queue elements containing queued transmit data buffer identifiers to be sequentially provided to the selected one of the N radio modules starting with a next-to-radio assist engine transmit queue element, to communicate a next-to-radio transmit data buffer identifier in the next-to-radio assist engine transmit queue element, and to determine another next-to-radio assist engine transmit queue element ac-cording to the transmitter queue management information.

10. The wireless network access device of claim 9 where the assist engine is configured:

to generate the assist engine transmit queue as a linked list of assist engine transmit queue elements where the transmit queue management information in each assist engine transmit queue element includes an identifier to a next linked list and the assist engine includes a linked list transmit status block.

11. The wireless network access device of claim 10 where the assist engine is configured:

to generate multiple assist engine transmit queues as linked lists of fixed length queues.

12. The wireless network access device of claim 1 where:

the transmit data spaces identified by the transmit data buffer identifiers are control descriptors having links to additional control descriptors and a link to the transmit data space containing the data to be transmitted; and the transmit data buffer identifiers are pointers to the control descriptors.

13. The wireless network access device of claim 1 where:

the at least one radio transmit buffer in each radio module is configured to have a fixed number of radio transmit buffer entries, and the radio processor generates additional radio transmit buffers as each at least one radio transmit buffer is filled.

14. The wireless network access device of claim 1 where:

the at least one radio transmit buffer in each radio module is configured to have a fixed number of transmit buffer entries, and the radio processor generates a number of the at least one radio transmit buffer based on an expected input traffic.

15. A wireless network access device comprising:

a radio interface comprising a serial communication line, a switch, and M serial connections to M connectors for connecting up to M corresponding detachable radio modules, the radio interface configured to form up to M individually addressable radio communications paths via the switch;

each radio module comprising a radio configured to communicate with client devices in a corresponding coverage area and a radio processor configured to manage at least one radio transmit buffer configured to store transmit data buffer identifiers, each transmit data buffer identifiers identifying a corresponding data space containing data to be transmitted, the radio processor configured to retrieve a next data packet to transmit from the data space corresponding to a current transmit data buffer identifier and to identify a next transmit data buffer identifier as the current transmit data buffer identifier;

a network interface configured to provide data network access;

a processor configured to manage communication between the client devices that communicate with the radio modules and a data network via the radio interface and the network interface when N radio modules are connected to the radio interface, where N≤M;

N transmit buffers in a system memory corresponding to the N connected radio modules, each transmit buffer comprising a plurality of transmit data buffer identifiers identifying the data spaces in system memory containing data to be transmitted by the corresponding radio module, the processor configured to communicate a next-in-queue transmit data buffer identifier to a selected one of the N radio modules after the selected one of the N radio modules has used the current transmit data buffer identifier to transmit the corresponding data packet;

an assist engine connected in the serial connection between the processor and the switch, the assist engine configured:

to receive the next-in-queue transmit data buffer identifier, to store the next-in-queue transmit data buffer identifier in an assist engine transmit queue corresponding to the selected one of the N radio modules, and to communicate a next-to-radio transmit data buffer identifier to the selected one of the N radio modules from the assist engine transmit queue.

16. The wireless network access device of claim 15 where the assist engine is configured:

to generate an assist engine transmit queue element for storing the next-in-queue transmit data buffer identifier received from the processor and transmitter queue management information, to add the assist engine transmit queue element to the assist engine transmit queue, the assist engine transmit queue comprising a plurality of assist engine transmit queue elements containing queued transmit data buffer identifiers to be sequentially provided to the selected one of the N radio modules starting with a next-to-radio assist engine transmit queue element, to communicate a next-to-radio transmit data buffer identifier in the next-to-radio assist engine transmit queue element, and to determine another next-to-radio assist engine transmit queue element ac-cording to the transmitter queue management information.

17. The wireless network access device of claim 15, where:

the radio processor in the radio module is further configured to manage at least one radio receiving buffer configured to store receiver buffer identifiers, each receiver buffer identifier identifying a corresponding received data space, the radio processor configured to store a next received data packet in the received data space corresponding to a current receiver buffer identifier and to identify a next receiver buffer identifier as the current receiver buffer identifier;

the wireless network access device further comprising N receive buffers in a system memory corresponding to the N connected radio modules, each receive buffer comprising a plurality of receiver buffer identifiers identifying the received data spaces in system memory designated for storing received data from the corresponding radio module, the processor configured to communicate a next-in-queue receiver buffer identifier to a selected one of the N radio modules after the selected one of the N radio modules has used the current receiver buffer identifier to store a received data packet;

where the assist engine is configured:

to receive the next-in-queue receiver buffer identifier, to store the next-in-queue receiver buffer identifier in an assist engine receive queue corresponding to the selected one of the N radio modules, and to communicate a next-to-radio receiver buffer identifier to the selected one of the N radio modules from the assist engine receive queue.

18. The wireless network access device of claim 17, where the assist engine is configured:
- to generate an assist engine receive queue element for storing the next-in-queue receiver buffer identifier received from the processor and receiver queue management information,
- to add the assist engine receive queue element to the assist engine receive queue, the assist engine receive queue comprising a plurality of assist engine receive queue elements containing queued receiver buffer identifiers to be sequentially pro-vided to the selected one of the N radio modules starting with a next-to-radio assist engine receive queue element,
- to communicate a next-to-radio receiver buffer identifier in the next-to-radio assist engine receive queue element, and
- to determine another next-to-radio assist engine receive queue element according to the receiver queue management information.

\* \* \* \* \*